(12) United States Patent
Rosania et al.

(10) Patent No.: US 11,206,231 B2
(45) Date of Patent: Dec. 21, 2021

(54) GROUP-BASED COMMUNICATION INTERFACE WITH SUBSIDIARY CHANNEL-BASED THREAD COMMUNICATIONS

(71) Applicant: Slack Technologies, Inc., San Francisco, CA (US)

(72) Inventors: Paul Rosania, San Francisco, CA (US); Milo Watanabe, San Francisco, CA (US); Daniel Stewart Butterfield, Vancouver (CA); Neil Walker, San Francisco, CA (US); Patrick Kane, Vancouver (CA); Hubert Florin, Vancouver (CA); Wayne Fan, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 154 days.

(21) Appl. No.: 15/730,044

(22) Filed: Oct. 11, 2017

(65) Prior Publication Data
US 2019/0058680 A1   Feb. 21, 2019

Related U.S. Application Data

(60) Provisional application No. 62/547,605, filed on Aug. 18, 2017.

(51) Int. Cl.
*H04L 12/58* (2006.01)
*H04L 29/08* (2006.01)

(52) U.S. Cl.
CPC .............. *H04L 51/16* (2013.01); *H04L 67/22* (2013.01); *H04L 67/306* (2013.01)

(58) Field of Classification Search
CPC ........ H04L 51/16; H04L 67/22; H04L 67/306
See application file for complete search history.

(56) References Cited

U.S. PATENT DOCUMENTS

2006/0128404 A1* 6/2006 Klassen ................ G06F 3/0485
455/466
2016/0344679 A1* 11/2016 Lane ...................... G06F 40/106
(Continued)

FOREIGN PATENT DOCUMENTS

WO    WO-2011141624 A1 * 11/2011 ............. H04L 51/24

OTHER PUBLICATIONS

Matsumoto, T et al., "Chocoa Communicator—A New Communication System Based on Awareness and Text Communications-", FUJITSU Sci. Tech J., 36, 2, (Dec. 2000) 154-161.
(Continued)

*Primary Examiner* — Uzma Alam
(74) *Attorney, Agent, or Firm* — Lee & Hayes, P.C.

(57) ABSTRACT

Provided is a group-based communication interface configured to allow members of the interface to communicate within group-based communication channels. The group-based communication interface is configured to relegate selected group-based messaging communications to a separate display pane, where additional messaging communications can be received, thereby maintaining a focused selected group-based communication channel. The selected group-based communication channel is updated to indicate that the selected group-based messaging communications was relegated to a separate display pane, informing the channel members while also allowing the channel members to access the separate display pane if desired. Accordingly, the selected group-based communication interface provides for efficient and focused group-based communications.

31 Claims, 15 Drawing Sheets

(56) References Cited

U.S. PATENT DOCUMENTS

| | | | | | |
|---|---|---|---|---|---|
| 2017/0142036 | A1* | 5/2017 | Li | ............................ | H04L 51/16 |
| 2017/0272388 | A1* | 9/2017 | Bern | ........................ | H04L 51/12 |
| 2017/0357422 | A1* | 12/2017 | Jon | ......................... | G06F 3/0484 |
| 2017/0366493 | A1* | 12/2017 | Wilde | ................... | G06Q 10/101 |
| 2018/0287982 | A1* | 10/2018 | Draeger | ................... | H04L 51/16 |
| 2018/0293996 | A1* | 10/2018 | Mortis | ..................... | G10L 21/10 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield On How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia,, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up The Slack", TEDIUM, [online][retrieved May 9, 2019], Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

* cited by examiner

500 CHANNEL LIST PANE

- 501A — ACME CORP
- 501B — MATT
- 502 — THREADS (1)
- 503 — COMMUNICATION CHANNELS
  - #LAUNCH-REACJ
  - #ANNOUNCEMENTS
  - #THINGS-TO-KNOW
  - #MARKETING-TEAM

530 THREAD SUMMARY COMMUNICATION PANE

531A — #ANNOUNCEMENTS

532A — MATT: DECEMBER 13TH AT 11:00 AM ~ 536A
THE HOLIDAY PARADE WILL TAKE PLACE ON DECEMBER 20TH. BRING YOUR FAMILIES!
2 REPLIES 10:35 AM ~ 537A

532C — SAM: 9:10 AM ~ 536C
DO YOU WANT TO RIDE TOGETHER TO THE PARADE? JULIE WANTS TO GET THERE EARLY.

532D — MATT: 10:35 AM ~ 536D
SURE! ANNA AND I WILL STOP BY YOUR HOUSE AROUND 8.

533A — MESSAGE #ANNOUNCEMENTS
534A — ☐ SHARE WITH #ANNOUNCEMENTS    535A — SEND

531B — #THINGS-TO-KNOW

532B — LUCY: 9:03 AM ~ 536B
DANIEL WILSON WILL JOIN OUR TEAM STARTING JANUARY 1ST!
1 REPLY 9:35 AM ~ 537B

532E — JAMIE: 9:35 AM ~ 536E
MATT AND I WANT TO TAKE DANIEL TO LUNCH HIS FIRST DAY. CAN YOU ADD IT TO HIS ITINERARY? @MATT ~ 539

538 — 1 NEW REPLY
533B — MESSAGE #ANNOUNCEMENTS
534B — ☐ SHARE WITH #THINGS-TO-KNOW    535B — SEND

800 CHANNEL LIST PANE
- 801A ACME CORP
- 801B MATT
- 802 THREADS
- 803 COMMUNICATION CHANNELS
  - #LAUNCH-REACTJ
  - #ANNOUNCEMENTS
  - #THINGS-TO-KNOW
  - #MARKETING-TEAM

810 CHANNEL MESSAGING PANE

ANNOUNCEMENTS — 811

812A — MATT: DECEMBER 13TH AT 11:00 AM — 816A
THE HOLIDAY PARADE WILL TAKE PLACE ON DECEMBER 20 STARTING AT 8 AM. BRING YOUR FAMILIES!
3 REPLIES 11:38 AM — 817A

812B — MADISON: 8:10 AM — 816B
FRANNY GIBSON WILL BE PRESENTING A LUNCH AND LEARN COVERING UPDATES TO THE NEW WORKFLOW SYSTEM ON MONDAY AT 12PM. LUNCH WILL BE PROVIDED!
5 REPLIES 11:56 AM — 817B

818 — BROADCASTED FROM A SECONDARY CONVERSATION STARTED BY KRISEIN:

818A — KRISTEN: DECEMBER 12TH AT 5:48 PM — 819A
WE JUST ANNOUNCED A BRAND NEW LEARNING AND DEVELOPMENT COURSE ON NEGOTIATIONS...
2 REPLIES 1:34 PM — 817C

818B — SARAH: 1:34 PM — 819B
THE LEARNING AND DEVELOPMENT COURSE WILL BE REQUIRED FOR ALL NEW EMPLOYEES.

820 THREAD COMMUNICATION PANE

821 — KRISTEN: DECEMBER 12TH AT 5:48 PM — 827
IN # ANNOUNCEMENTS WE JUST ANNOUNCED A BRAND NEW LEARNING AND DEVELOPMENT COURSE ON NEGOTIATIONS. REGISTRATION IS NOW OPEN!

822A — MATT: 9:10 AM — 828A
IS THIS A VOLUNTARY COURSE? @SARAH — 829

822B — SARAH: 1:34 PM — 828B
THE LEARNING AND DEVELOPMENT COURSE WILL BE REQUIRED FOR ALL NEW EMPLOYEES.

823 — SEND A REPLY

824 — ☐ SHARE WITH #ANNOUNCEMENTS

825 — SEND

826 — UNFOLLOW

GROUP-BASED COMMUNICATION INTERFACE WITH SUBSIDIARY CHANNEL-BASED THREAD COMMUNICATIONS

CROSS-REFERENCE TO RELATED APPLICATIONS

This application claims priority to and the benefit of U.S. Provisional Patent Application Ser. No. 62/547,605, entitled "Group-Based Communication Interface With Subsidiary Channel-Based Thread Communications" and filed on Aug. 18, 2017, the entire contents of which are hereby incorporated by reference.

BACKGROUND

Various messaging systems are available that allow users to have continuous conversations electronically between each other. In such systems, one or more users may send messages back and forth discussing various topics. In certain systems, the string of messages may be saved and later accessible to the participants of the conversation. Applicant has identified a number of deficiencies and problems associated with conventional messaging systems. Through applied effort, ingenuity, and innovation, many of these identified problems have been solved by developing solutions that are included in embodiments of the present invention, many examples of which are described in detail herein. communication

BRIEF SUMMARY

In general, embodiments of the present invention provided herein include methods, apparatus, and computer program products for facilitating a group-based communication interface.

In some embodiments, a method may be provided including generating a group-based communication interface that is configured to efficiently arrange an array of messaging communications within a defined display window, the group-based communication interface defining a channel list pane comprising a plurality of group-based communication channels and a channel messaging pane, the method including receiving a first messaging communication associated with a selected group-based communication channel of the plurality of group-based communication channels; displaying the first messaging communication to the channel messaging pane; receiving a thread request to create a subsidiary channel-based thread communication associated with the first messaging communication in the selected group-based communication channel; and in response to receiving the thread request, generating and displaying a thread summary indicator within the channel messaging pane proximate the first messaging communication. In some embodiments, the method may further include generating a thread communication pane in response to receiving the thread request; receiving a thread communication message; and displaying the thread communication message to the thread communication pane. The method may also include in response to receiving the thread communication message, updating the thread summary indicator within the channel messaging pane to indicate that the thread communication message was received. The thread summary indicator may include a thread count and a latency indicator, and the channel list pane, channel messaging pane, and thread communication pane may be configured to be viewable simultaneously. In some embodiments, the thread summary indicator within the channel messaging pane may be configured to be selectable by any user of the selected group-based communication channel.

In some embodiments, the method may further include displaying messaging communication information associated with the subsidiary channel-based thread communication in the thread communication pane. In some embodiments, the method may further include generating a thread communication pane in response to receiving the thread request; receiving a thread communication message; receiving a profile identifier with the thread communication message, wherein the profile identifier is configured to associate the thread communication message with a user of the selected group-based communication channel; displaying the thread communication message to the thread communication pane; and in response to receiving the profile identifier in the thread communication message, updating a thread indication in the channel list pane, the thread indication configured to indicate that the profile identifier was received in the thread communication message.

In some embodiments, the method may further include receiving a thread summary view request and, in response to receiving the thread summary view request, presenting at least a portion of the subsidiary channel-based thread communication and at least a portion of one or more thread communication messages in a thread summary communication pane. The method may further include in response to receiving the thread summary view request, presenting a notification in the thread summary communication pane, wherein the notification is configured to indicate the receipt of new thread communication messages, the new thread communication messages being thread communication messages that a thread-associated user profile has not yet viewed.

Further, in some embodiments, the method may include receiving a selected thread view request and, in response to receiving the selected thread view request, presenting each thread communication message of the selected thread view request in a thread communication pane. In some embodiments, the method may include receiving a follow request that is configured to activate notifications corresponding to a thread and in response to receiving the follow request, updating a thread indication in the channel list pane, the thread indication configured to indicate that the follow request was received.

Some embodiments of the present method include receiving a subsequent thread communication message in the thread communication pane and receiving a share request, the share request configured to reproduce the thread communication message in the selected group-based communication channel; and in response to receiving the share request, reproducing the first messaging communication and the subsequent thread communication message in the selected group-based communication channel. The method may further include receiving a selected thread view request configured to view the thread communication message in the thread communication pane and in response to receiving the selected thread view request, presenting the thread communication message in the thread communication pane.

Another embodiment of the present invention provided is an apparatus including at least a processor, and a memory associated with the processor having computer coded instructions therein, with the computer coded instructions configured to, when executed by the processor, efficiently arrange an array of messaging communications within a defined display window, the group-based communication interface defining a channel list pane comprising a plurality of group-based communication channels and a channel messaging pane by causing the apparatus to receive a first messaging communication associated with a selected group-based communication channel of the plurality of group-based communication channels; display the first messaging communication to the channel messaging pane; receive a thread request to create a subsidiary channel-based thread communication associated with the first messaging communication in the selected group-based communication channel; and in response to receiving the thread request, generate and display a thread summary indicator within the channel messaging pane proximate the first messaging communication. In some embodiments, the thread summary indicator may include a thread count and a latency indicator, and in some embodiments, the channel list pane, channel messaging pane, and thread communication pane may be configured to be viewable simultaneously. The thread summary indicator within the channel messaging pane may be configured to be selectable by any user of the selected group-based communication channel.

In some embodiments, the computer coded instructions may be configured to, when executed by the processor, further cause the apparatus to generate a thread communication pane in response to receiving the thread request; receive a thread communication message; and display the thread communication message to the thread communication pane. The computer coded instructions may be configured to, when executed by the processor, further cause the apparatus to in response to receiving the thread communication message, update the thread summary indicator within the channel messaging pane to indicate that the thread communication message was received.

In some embodiments, the computer coded instructions may be configured to, when executed by the processor, further cause the apparatus to display messaging communication information associated with the subsidiary channel-based thread communication in the thread communication pane.

Further, in some embodiments, the computer coded instructions may be configured to, when executed by the processor, further cause the apparatus to generate a thread communication pane in response to receiving the thread request; receive a thread communication message; receive a profile identifier with the thread communication message, wherein the profile identifier is configured to associate the thread communication message with a user of the selected group-based communication channel; display the thread communication message to the thread communication pane; and in response to receiving the profile identifier in the thread communication message, update a thread indication in the channel list pane, the thread indication configured to indicate that the profile identifier was received in the thread communication message.

In some embodiments, the computer coded instructions may be configured to, when executed by the processor, further cause the apparatus to receive a thread summary view request and, in response to receiving the thread summary view request, present at least a portion of the subsidiary channel-based thread communication and at least a portion of one or more thread communication messages in a thread summary communication pane. The computer coded instructions may be configured to, when executed by the processor, further cause the apparatus to, in response to receiving the thread summary view request, present a notification in the thread summary communication pane, wherein the notification is configured to indicate the receipt of new thread communication messages, the new thread communication messages being thread communication messages that a thread-associated user profile has not yet viewed.

Further, in some embodiments, the computer coded instructions may be configured to, when executed by the processor, further cause the apparatus to receive a selected thread view request and, in response to receiving the selected thread view request, present each thread communication message of the selected thread view request in a thread communication pane.

In some embodiments, the computer coded instructions may be configured to, when executed by the processor, further cause the apparatus to receive a follow request that is configured to activate notifications corresponding to a thread and in response to receiving the follow request, update a thread indication in the channel list pane, the thread indication configured to indicate that the follow request was received.

Still further, in some embodiments, the computer coded instructions may be configured to, when executed by the processor, further cause the apparatus to receive a subsequent thread communication message in the thread communication pane and receiving a share request, the share request configured to reproduce the thread communication message in the selected group-based communication channel; and in response to receiving the share request, reproduce the first messaging communication and the subsequent thread communication message in the selected group-based communication channel. The computer coded instructions may be configured to, when executed by the processor, further cause the apparatus to receive a selected thread view request configured to view the thread communication message in the thread communication pane and in response to receiving the selected thread view request, present the thread communication message in the thread communication pane.

In yet another example embodiment, a computer program product may be provided that may include a non-transitory computer readable medium having computer program instructions stored therein, said computer program instructions when executed by a processor efficiently arrange an array of messaging communications within a defined display window, the group-based communication interface defining a channel list pane comprising a plurality of group-based communication channels and a channel messaging pane by causing the computer program product to receive a first messaging communication associated with a selected group-based communication channel of the plurality of group-based communication channels; display the first messaging communication to the channel messaging pane; receive a thread request to create a subsidiary channel-based thread communication associated with the first messaging communication in the selected group-based communication channel; and in response to receiving the thread request, generate and display a thread summary indicator within the channel messaging pane proximate the first messaging communication.

In some embodiments, the computer program instructions may be configured to, when executed by the processor, further cause the computer program product to generate a thread communication pane in response to receiving the thread request; receive a thread communication message; and display the thread communication message to the thread communication pane. In some embodiments, the computer program instructions may be configured to, when executed by the processor, further cause the computer program product to in response to receiving the thread communication message, update the thread summary indicator within the channel messaging pane to indicate that the thread communication message was received. The thread summary indicator may include a thread count and a latency indicator, and the channel list pane, channel messaging pane, and thread communication pane may be configured to be viewable simultaneously.

In some embodiments, the thread summary indicator within the channel messaging pane may be configured to be selectable by any user of the selected group-based communication channel. In some embodiments, the computer program instructions may be configured to, when executed by the processor, further cause the computer program product to display messaging communication information associated with the subsidiary channel-based thread communication in the thread communication pane.

Further, in some embodiments, the computer program instructions may be configured to, when executed by the processor, further cause the computer program product to: generate a thread communication pane in response to receiving the thread request; receive a thread communication message; receive a profile identifier with the thread communication message, wherein the profile identifier is configured to associate the thread communication message with a user of the selected group-based communication channel; display the thread communication message to the thread communication pane; and in response to receiving the profile identifier in the thread communication message, update a thread indication in the channel list pane, the thread indication configured to indicate that the profile identifier was received in the thread communication message. In some embodiments, the computer program instructions may be configured to, when executed by the processor, further cause the computer program product to receive a thread summary view request and, in response to receiving the thread summary view request, present at least a portion of the subsidiary channel-based thread communication and at least a portion of one or more thread communication messages in a thread summary communication pane.

In some embodiments, the computer program instructions may be configured to, when executed by the processor, further cause the computer program product to, in response to receiving the thread summary view request, present a notification in the thread summary communication pane, wherein the notification is configured to indicate the receipt of new thread communication messages, the new thread communication messages being thread communication messages that a thread-associated user profile has not yet viewed. Further, in some embodiments, the computer program instructions may be configured to, when executed by the processor, further cause the computer program product to receive a selected thread view request and, in response to receiving the selected thread view request, present each thread communication message of the selected thread view request in a thread communication pane.

In some embodiments, the computer program instructions may be configured to, when executed by the processor, further cause the computer program product to receive a follow request that is configured to activate notifications corresponding to a thread and in response to receiving the follow request, update a thread indication in the channel list pane, the thread indication configured to indicate that the follow request was received.

Further, in some embodiments, the computer program instructions may be configured to, when executed by the processor, further cause the computer program product to receive a subsequent thread communication message in the thread communication pane and receive a share request, the share request configured to reproduce the thread communication message in the selected group-based communication channel; and in response to receiving the share request, reproduce the first messaging communication and the subsequent thread communication message in the selected group-based communication channel. The computer program instructions may be configured to, when executed by the processor, further cause the computer program product to receive a selected thread view request configured to view the thread communication message in the thread communication pane and in response to receiving the selected thread view request, present the thread communication message in the thread communication pane.

BRIEF DESCRIPTION OF THE FIGURES

Reference will now be made to the accompanying drawings, which are not necessarily drawn to scale, and wherein:

FIG. 5 illustrates an example group-based communication interface having a channel list pane and a thread summary communication pane in accordance with some embodiments discussed herein;

FIG. 8 illustrates an example group-based communication interface having a channel list pane, a channel messaging pane, and a thread communication pane in accordance with some embodiments discussed herein;

DETAILED DESCRIPTION

Figure 1:
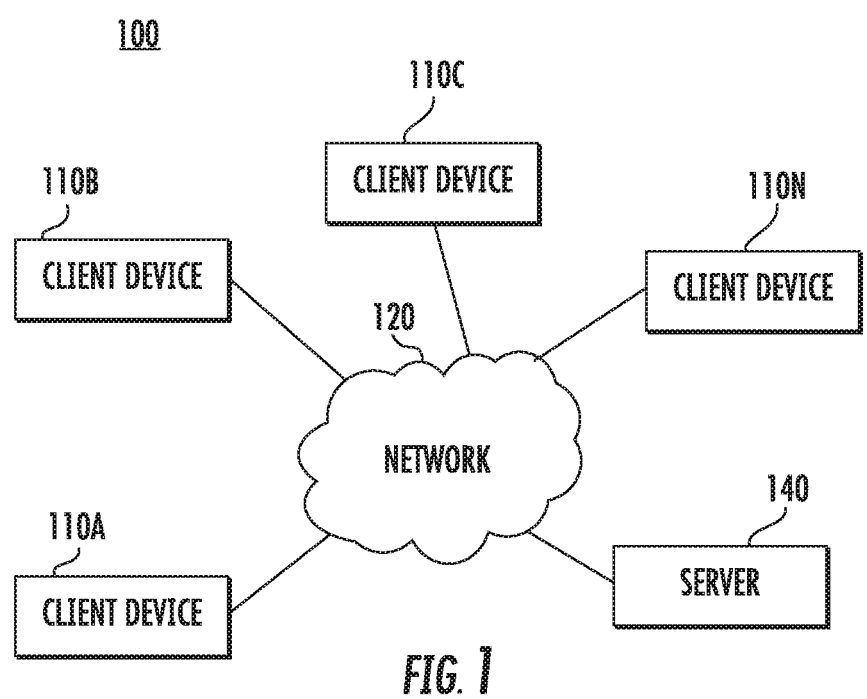
FIG. 1 illustrates an example system in accordance with some embodiments discussed herein.

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

As used herein, the term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) may be displayed to each member of the group-based communication channel. For instance, in one embodiment, a common set of group-based messaging communications will be displayed to each member of the respective group-based communication channel such that the content of the group-based communication channel (i.e., messaging communications) will not vary per member of the channel. However, in another embodiment, a member may join a group-based communication channel and only be able to view subsequent group-based messaging communications (as opposed to historical group-based messaging communications). The group-based communication channels are generally topic-oriented, long-lasting channels as opposed to ad hoc ephemeral conversations in conventional messaging apps.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

As used herein, the term "profile identifier" refers to any data that identifies a user. For example, and without limitation, a profile identifier may include a unique identifier, an IP address, a MAC address, and the like. In some embodiments, the profile identifier may be "highlight words" which are words/terms that a member requests to follow. For instance, when a highlight word is used in a thread communication message, the associated member may be notified of such communication (e.g., by displaying a thread indication as discussed herein).

As used herein, a "thread-associated user profile" refers to a user profile that is associated with the respective thread. A "channel-associated user profile" refers to a user profile that is associated with the respective channel. For instance, if a member follows a thread, then the member will be considered a thread-associated user profile.

As used herein, the term "profile data" refers to any data associated with a profile identifier, such as, but not limited to, biographical data or any other data that may serve to distinguish one or more profiles from each other.

As used herein, the term "biographical data" refers to information associated with a person(s) identified in a profile, such as, for example, birth dates, allergies, socio-economic data, interests, place of residence, login credential information, and/or any other identifying information about a profile.

The terms "group-based communication channel identifier" or "channel identifier" refer to one or more items of data by which a group-based communication channel may be identified. For example, a group-based communication channel identifier may comprise ASCII text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication," "communication message," and "message" refer to any electronically generated digital content object provided by a user using a client device and that is configured for display within a group-based communication channel. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

Thread communication messages are communications received in threads. Otherwise, the group-based messaging communications are generally initiated in channels. A "thread" is a collection of communication messages displayed to a subsidiary feed arising from or otherwise associated with a selected group-based messaging communication displayed in a selected group-based communication channel. A thread may include one or more "threaded messages" or "thread communication messages" that are linked together in the subsidiary feed, wherein each is associated with the selected group-based messaging communication.

A "new messaging communication" or a new communication message is a communication that the selected group-based communication interface has not yet presented to a particular member (that is, the member viewing the interface).

Because a thread is linked to a selected group-based messaging communication it arises in the context of a particular group-based communication channel. However, the thread is presented separately from the group-based messaging communications displayed within the selected group-based communication channel. Thread communication messages received in the thread are not automatically displayed in the selected group-based communication channel. Instead, the selected group-based communication channel is updated with a thread summary indicator that is configured to indicate that the thread was established and to indicate the receipt of subsequent thread communication messages in the thread. In some embodiments, a member can choose to override this such that the thread communication message also appears in the selected group-based communication channel.

As used herein, "thread summary indicator" refers to a visual identifier that indicates that an action has been taken with regards to a thread (e.g., a thread has been created, a thread communication message has been received in the thread, and/or that a profile identifier was received in the thread). A "notification" is a specific indication configured to indicate the number of new messaging communications (e.g., new thread communication message) and new threads that the selected group-based communication interface has not yet presented to a particular member (that is, the member viewing the interface).

As used herein, "defined display window" is a defined area in the selected group-based communication interface where information is displayed. A "channel list pane" is a display pane configured to display lists of group-based communication channels and/or threads that are configured to indicate when new messaging communications are received in the respective threads and/or group-based communication channels. The channel list pane may include actuators for initiating requests to view selected group-based communication channels and/or a summary of selected threads. The channel list pane may include additional information, such as messaging communication information, notifications, the name of the group, name of the particular member viewing the interface, etc. A "thread communication pane" is a display pane that is configured to display a selected thread. The thread communication pane may include a variety of information, such as messaging communication information, and may include a variety of actuators for initiating requests. A "thread summary communication pane" is a display pane that is configured to display a summary of threads that the particular member follows. The summary typically includes at least a portion of one or more thread communication messages as well as at least a portion of the selected group-based messaging communications from which the thread was created. The thread summary communication pane may also display various notifications, actuators, and indicators/indications. A channel messaging pane is a display pane configured to display a selected group-based communication channel and may display a variety of information and a variety of notifications, actuators, and indicators/indications.

As used herein, "messaging communication information" refers to any information associated with the messaging communication, such as information related to the user who created the messaging communication, the group-based communication channel on which the messaging communication was first provided or is associated with (e.g., the name of the group-based communication channel), the time and date that the messaging communication was first provided, threads stemming from the messaging communication (e.g., date and time the thread was made or last received a messaging communication, etc.), and any other identifying information related to the messaging communication.

As used herein, "request" refers to an instruction or direction, generally initiated by a user, for an action to take place. For instance, a user may request to view a specific group-based communication channel (e.g., selected channel view request), create a thread (e.g., thread request), view a selected thread (e.g., selected thread view request), view a summary of threads the user follows (e.g., thread summary view request), view profile data of another user, view certain messaging communication information, share a select thread communication message from a thread to the selected group-based communication channel from which the thread was created (e.g., share request), receive notifications regarding a thread (e.g., follow request), notify a selected member of a thread communication message (e.g., follow request), etc.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

Overview

Various embodiments of the invention are directed to systems and devices that are configured to efficiently arrange an array of messaging communications within a defined display window for a selected group-based communication interface (e.g., a user interface that is configured for messaging communications for a given enterprise such as ACME Corp) from a plurality of group-based communication interfaces (e.g., user interfaces that are configured for messaging communications of other enterprises such as Beta Corp or Charlie Corp). The selected group-based communication interface includes a plurality of group-based communication channels (e.g., a marketing channel, sales channel, accounting channel, etc.). The selected group-based communication interface is accessible and viewable to a select group of users, such as a group of employees of a business or organization (e.g., the ACME Corp interface would be accessible and viewable to ACME Corp employees but not to Beta Corp employees).

The selected group-based communication interface is updated and arranged per the actions of the members of that group-based communication interface and is separate and distinct from other group-based communication interfaces. Each of the plurality of group-based communication channels in the selected group-based communication interface may include one or more group-based messaging communications, or may be empty (in that the selected group-based communication channel may not contain a group-based messaging communication at a certain point in time).

The selected group-based communication interface is configured to receive requests to create threads or subsidiary communication messages stemming from selected group-based messaging communications in group-based communication channels. The selected group-based communication interface is configured to display the thread in a separate feed from the selected group-based communication channel. Thread communication messages can be received in the thread allowing the conversation to continue. The selected group-based communication interface can thereby allow for relegating of conversations, such as those that relate to a minor issue or to an issue particular to certain members of the group-based communication channel, to a separate display pane, where the conversations can continue, while also maintaining a focused conversation in the selected group-based communication channel.

At the same time, the selected group-based communication channel is updated to indicate that the thread was created and to present a count of how many communications have been received in the thread, allowing channel members to access the thread if desired. The selected group-based communication interface thereby is configured to allow for the selected group-based communication channel (and all interested members thereof) to be informed of the relegated conversation (i.e., the thread). Accordingly, the selected group-based communication interface provides for efficient and focused group-based communications.

The selected group-based communication interface is also configured to receive a share request and reproduce the desired thread communication in the selected group-based communication channel. Members of the selected group-based communication channels are thereby informed when important or relevant information is received in the thread (e.g., information regarding a decision or activity relevant to other members of the selected group-based communication channel). A member of the selected group-based communication channel can access the full thread at any time by selecting a thread summary indicator presented in the selected group-based communication channel. A member of the selected group-based communication channel can also access the full thread at any time by selecting a thread communication message that has been shared back to the selected group-based communication channel.

The selected group-based communication interface thereby efficiently and effectively provides an interface for group-based communications. Group-based messaging communications within the plurality of group-based communication channels can be relegated to threads to continue conversations without congesting the selected group-based communication channel with side conversations, while also informing the members of the selected group-based communication channel that the side conversation is or has taken place and allowing those members to access and view the side conversations.

Pertinent information in the thread can be shared to the selected group-based communication channel further keeping all members "in the loop" with relevant information.

This allows members of the group-based communication interface to spend less time reading and reviewing irrelevant information and allows a member to quickly access relevant information, thereby increasing the efficiency and effectiveness of group-based messaging communications. Further, members of the group-based communication interface will only be notified of threads under certain circumstances. Thus, members of group-based communication channels will not receive notifications for irrelevant information. With more focused monitoring by the members of the group-based communication channels and a reduced amount of notifications to the members of the group-based communication channels, there will be less strain on the system itself leading to increased lifetime and efficiency. The group-based communication interface also provides reduced network traffic and data processing by moving communication messages to a thread rather than including in the group-based communication channel, and provides reduced client data storage as thread communication messages in the thread are not necessarily downloaded from the server for viewing in the group-based communication channel.

The selected group-based communication interface is configured to allow members of the interface to communicate within group-based communication channels to provide relevant information to other members efficiently and effectively. The selected group-based communication interface thereby efficiently and effectively provides an interface for group-based communications rooted in computer technology in order to overcome a problem specifically arising in the realm of computer networks. The selected group-based communication interface may be used as part of a standalone service, application, or device or it may be applied as a layer atop an existing service application or device.

As will be discussed in greater detail below, the selected group-based communication interface is not limited to displaying group-based messaging communications and can also be configured to display a wide variety of messaging communications for any purpose that might be of interest to a member (e.g., direct messaging communications). The selected group-based communication interface may be used to visualize any set of group-based communication channels and messaging communications for any purpose and it may be used in connection with numerous exemplary system architectures as explained in further detail herein.

In some embodiments, the selected group-based communication interface may be configured to be used by a business, organization, team, or other group of individuals and may be tailored to suit the respective group's interests or specific data needs. One of ordinary skill in the art will appreciate that the concepts discussed herein may be applied to better visualize group-based messaging communications on a selected group-based communication interface.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 shows system 100 including an example network architecture for a system, which may include one or more devices and sub-systems that are configured to implement some embodiments discussed herein. For example, system 100 may include server 140, which can include, for example, the circuitry disclosed in FIGS. 2-3B, a server, or database, among other things (not shown). The server 140 may include any suitable network server and/or other type of processing device. In some embodiments, the server 140 may determine and transmit commands and instructions for rendering one or more group-based communication channels to client devices 110A-110N using data from the communications database 300. The communications database 300 may be embodied as a data storage device such as a Network Attached Storage (NAS) device or devices, or as a separate database server or servers. The communications database 300 includes information accessed and stored by the server 140 to facilitate the operations of the group-based communication system 100. For example, the communications database 300 may include, without limitation, a plurality of messaging communications organized among a plurality of group-based communication channels, and/or the like.

Server 140 can communicate with one or more client devices 110A-110N via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 120 may include a cellular telephone, an 802.11, 802.16, 802.20, and/or WiMax network. Further, the communications network 120 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication interface. In some embodiments, the protocol is a custom protocol of JSON objects sent via a Websocket channel. In some embodiments, the protocol is JSON over RPC, JSON over REST/HTTP, and the like.

The server 140 may provide for receiving of electronic data from various sources, including but not necessarily limited to the client devices 110A-110N. For example, the server 140 may be operable to receive and post or transmit group-based messaging communications provided by the client devices 110A-110N.

Client devices 110A-110N and/or server 140 may each be implemented as a personal computer and/or other networked device, such as a cellular phone, tablet computer, mobile device, point of sale terminal, inventory management terminal etc., that may be used for any suitable purpose in addition to presenting the interface to facilitate buying items and/or offering items for sale. The depiction in FIG. 1 of "N" users is merely for illustration purposes. Any number of users may be included in the system 100 so long as the users have the proper credentials for accessing the selected group-based communication interface. In one embodiment, the client devices 110A-110N may be configured to display an interface on a display of the client device for viewing, creating, editing, and/or otherwise interacting with at least one group-based communication channel, which may be provided by the server 140. According to some embodiments, the server 140 may be configured to display the interface on a display of the server 140 for viewing, creating, editing, and/or otherwise interacting with a group-based communication channel. In some embodiments, an interface of a client device 110A-110N may be different from an interface of a server 140. The client devices 110A-110N may be used in addition to or instead of the server 140. System 100 may also include additional client devices and/or servers, among other things. Additionally or alternatively, the client device 110A-110N may interact with the group-based communication system 100 via a web browser. As yet another example, the client device 110A-110N may include various hardware or firmware designed to interface with the group-based communication system 100.

The client devices 110A-110N may be any computing device as defined above. Electronic data received by the group-based communication server 106 from the client devices 110A-110N may be provided in various forms and via various methods. For example, the client devices 110A-110N may include desktop computers, laptop computers, smartphones, netbooks, tablet computers, wearables, and the like.

In embodiments where a client device 110A-110N is a mobile device, such as a smart phone or tablet, the client device 110A-110N may execute an "app" to interact with the group-based communication system 100. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 110A-110N may interact with the group-based communication system 100 via a web browser. As yet another example, the client device 110A-110N may include various hardware or firmware designed to interface with the group-based communication system 100.

In some embodiments of an exemplary group-based communication system, a message or messaging communication may be sent from a client device 110A-110N to a server 140. In various implementations, the message may be sent to the group-based communication system 100 over communications network 120 directly by a client device 110A-110N, the message may be sent to the group-based communication system 100 via an intermediary such as a message server, and/or the like. For example, the client device 110A-110N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 110A-110N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
        <timestamp>2020-12-31 23:59:59</timestamp>
        <user_accounts_details>
                <user_account_credentials>
                        <user_name>ID_user_1</user_name>
                        <password>abc123</password>
                        //OPTIONAL <cookie>cookieID</cookie>
                        //OPTIONAL <digital_cert_link>www.mydigitalcertificate.com/
JohnDoeDaDoeDoe@gmail.com/mycertifcate.dc</digital_cert_link>
                        //OPTIONAL <digital_certificate>_DATA_</digital_certificate>
                </user_account_credentials>
        </user_accounts_details>
        <client_details> //iOS Client with App and Webkit
                        //it should be noted that although several client details
                        //sections are provided to show example variants of client
                        //sources, further messages will include only on to save
                        //space
                <client_IP>10.0.0.123</client_IP>
                <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
                <client_product_type>iPhone6,1</client_product_type>
                <client_serial_number>DNXXX1X1XXXX</client_serial_number>
                <client_UDID>3XXXXXXXXXXXXXXXXXXXXXXXXD</client_UDID>
                <client_OS>iOS</client_OS>
                <client_OS_version>7.1.1</client_OS_version>
                <client_app_type>app with webkit</client_app_type>
                <app_installed_flag>true</app_installed_flag>
                <app_name>Error! Reference source not found..app</app_name>
                <app_version>1.0 </app_version>
                <app_webkit_name>Mobile Safari</client_webkit_name>
```

-continued

```
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our patent
policy.</contents>
        <attachments>patent_policy.pdf</attachments>
    </message>
</auth_request>
```

The group-based communication system 100 comprises at least one server 140 that may create a storage message based upon the received message to facilitate message indexing and storage in a communication database, as will be described further below. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the server 140 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
```

```
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have attached a copy our patent
policy.</contents>
    <attachments>patent_policy.pdf</attachments>
    <conversation_primitive>
        conversation includes messages: ID_message_8, ID_message_9, ID message_10,
        ID_message_11, ID_message_12
    </conversation_primitive>
</storage_message>
```

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from communication database). In one implementation, a storage message may be sent from group-based communication server 140 to facilitate indexing in the communication database. In another implementation, metadata associated with the message may be determined and the message may be indexed in the communication database. In one embodiment, the message may be indexed such that a company's or a group's messages are indexed separately (e.g., in a separate index associated with the group and/or company that is not shared with other groups and/or companies). In one implementation, messages may be indexed at a separate distributed database (e.g., to facilitate data isolation for security purposes).

If there are attachments associated with the message, file contents of the associated files may be used to index such files in the communication database to facilitate searching. In one embodiment, the files may be indexed such that a company's or a group's files are indexed at a separate distributed database.

Figure 2:
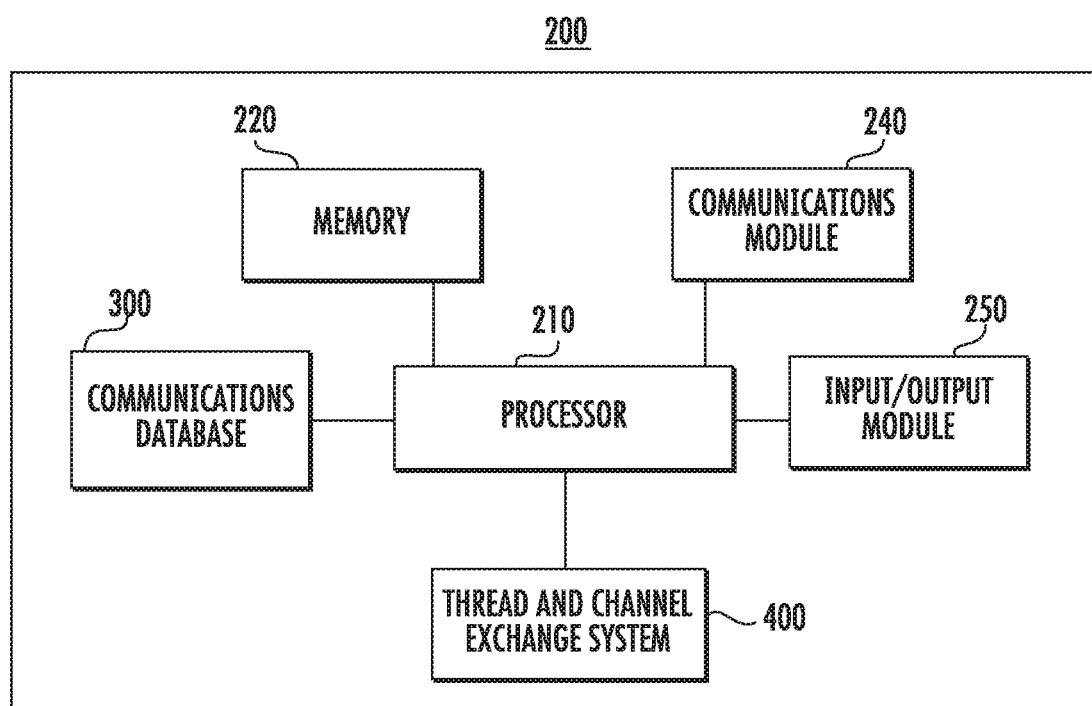
FIG. 2 illustrates a schematic block diagram of circuitry that can be included in a computing device in accordance with some embodiments discussed herein.
Figure 3A:
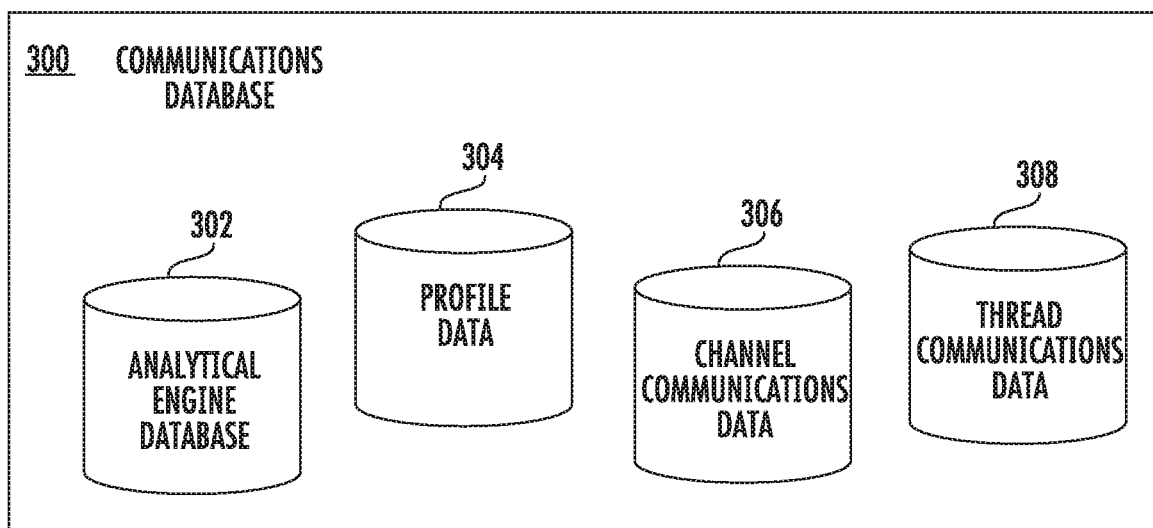
FIG. 3A illustrates an example communications database in accordance with some embodiments discussed herein.

FIG. 2 shows a schematic block diagram of circuitry 200, some or all of which may be included in, for example, server 140 and/or client devices 110A-110N. Any of the aforementioned systems or devices may include the circuitry 200 and may be configured to, either independently or jointly with other devices in a network 120 perform the functions of the circuitry 200 described herein. As illustrated in FIG. 2, in accordance with some example embodiments, circuitry 200 can includes various means, such as processor 210, memory 220, communications module 230, and/or input/output module 240. In some embodiments, communications database 300 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-14.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for enabling circuitry 200 to carry out various functions in accordance with example embodiments of the present invention. For example, in at least some embodiments, memory 220 is configured to buffer input data for processing by processor 210. Additionally or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 230 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 230 (like other components discussed herein) can be at least partially embodied as or otherwise controlled by processor 210. In this regard, communications module 230 may be in communication with processor 210, such as via a bus. Communications module 230 may include, for example, an antenna, a transmitter, a receiver, a transceiver, network interface card and/or supporting hardware and/or firmware/software for enabling communications with another computing device. Communications module 230 may be configured to receive and/or transmit any data that may be stored by memory 220 using any protocol that may be used for communications between computing devices. Communications module 230 may additionally or alternatively be in communication with the memory 220, input/output module 240 and/or any other component of circuitry 200, such as via a bus.

Input/output module 240 may be in communication with processor 210 to receive an indication of a user input and/or to provide an audible, visual, mechanical, or other output to a user (e.g., provider and/or consumer). Some example visual outputs that may be provided to a user by circuitry 200 are discussed in connection with FIGS. 1-14. As such, input/output module 240 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 240 may be reduced as compared to embodiments where circuitry 200 is implemented as an end-user machine (e.g., consumer device and/or provider device) or other type of device designed for complex user interactions. In some embodiments (like other components discussed herein), input/output module 240 may even be eliminated from circuitry 200. Alternatively, such as in embodiments wherein circuitry 200 is embodied as a server or database, at least some aspects of input/output module 240 may be embodied on an apparatus used by a user that is in communication with circuitry 200. Input/output module 240 may be in communication with the memory 220, communications module 230, and/or any other component(s), such as via a bus. One or more than one input/output module and/or other component can be included in circuitry 200.

Communications database 300 and thread and channel exchange system 310 may also or instead be included and configured to perform the functionality discussed herein related to storing, generating, and/or editing communications data. In some embodiments, some or all of the functionality of generating and/or editing group-based communication channels and/or profile data may be performed by processor 210. In this regard, the example processes and algorithms discussed herein can be performed by at least one processor 210, communications database 300, and/or thread and channel exchange system 310. For example, non-transitory computer readable media can be configured to store firmware, one or more application programs, and/or other software, which include instructions and other computer-readable program code portions that can be executed to control each processor (e.g., processor 210, communications database 300, and thread and channel exchange system 310) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

In some embodiments, a communications database 300 may be provided that includes channel communications data 306, profile data 304, thread communications data 308, and/or analytical engine data 302. Channel communications data 306 may include various information, such as messaging communication information, related to group-based communication channels. Thread communications data 308 may include various information, such as messaging communication information, related to threads. Profile data 304, in some embodiments, may include biographical data and/or preference data associated with individual profiles or group profiles. Additionally or alternatively, the communications database 300 may include analytical engine data 302 which provides any additional information needed by the processor 210 in computing messaging communications, indications, and requests.

Thread and channel exchange system 310 can be configured to analyze multiple sets of requests, indications, group-based messaging communications, and thread communication messages, such as the data in the communications database 300. In this way, thread and channel exchange system 310 may support multiple algorithms, including those discussed below with respect to group-based communication channels, group-based messaging communications, threads, and thread communication messages, etc., so that the selected algorithm may be chosen at runtime. Further, the present configuration can enable flexibility in terms of configuring additional contexts.

Figure 3B:
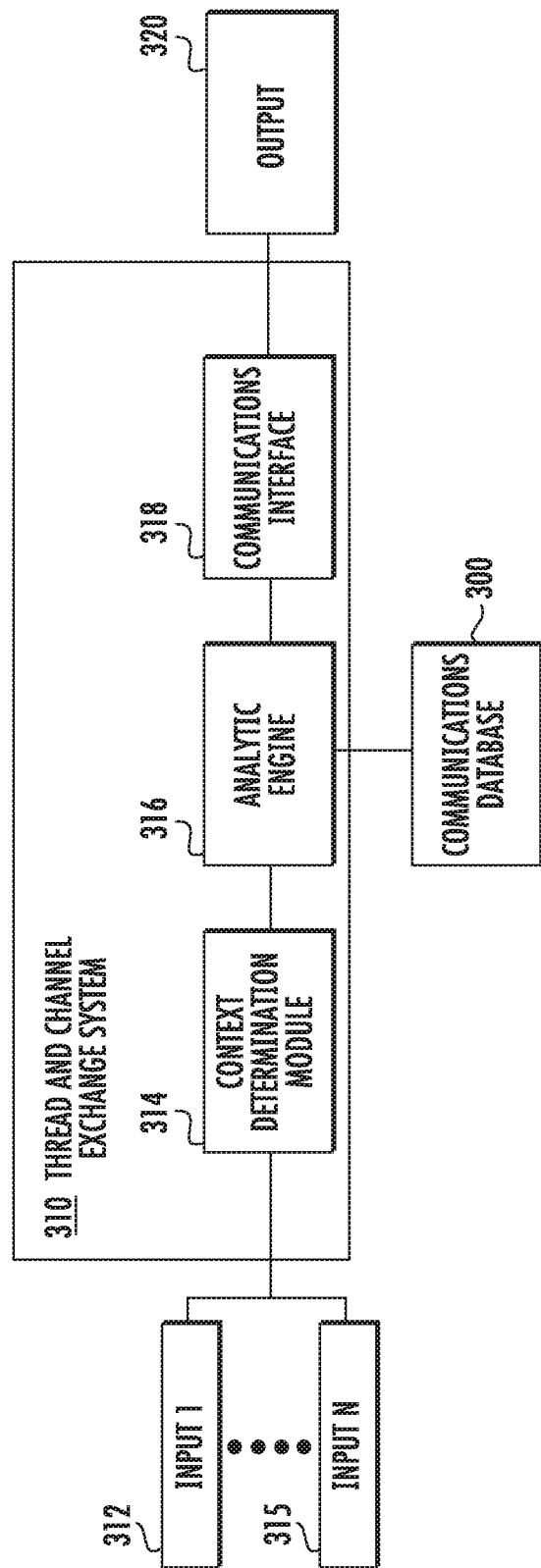
FIG. 3B illustrates an example thread and channel exchange system in accordance with some embodiments discussed herein.

In some embodiments, with reference to FIG. 3B, the thread and channel exchange system 310 may include a context determination module 314, an analytical engine 316, and communications interface 318, all of which may be in communication with the communications database 300. The thread and channel exchange system 310 may receive one or more group-based messaging communications, thread communication messages, requests, and indications and may generate the appropriate notifications, indications, messaging communications (channel-based and/or thread-based), and/or display panes with the appropriate communication channels or threads in response. The thread and channel exchange system 310 may use any of the algorithms or processes disclosed herein for receiving a request, messaging communications, and indications, and generating the appropriate notifications, indications, messaging communications (channel-based and/or thread-based), and/or display panes with the appropriate communication channels or threads in response. In some other embodiments, such as when the circuitry 200 is embodied in a server 140 and/or client devices 110A-110N, the thread and channel exchange system 310 may be located in another circuitry 200 or another device, such as another server 140 and/or client devices 110A-110N.

The thread and channel exchange system 310 can be configured to access data corresponding to multiple group-based communication channels and threads, and generate one or more appropriate notifications, indications, messaging communications (channel-based and/or thread-based), and/or display panes with the appropriate communication channels or threads in response.

The system may receive a plurality of inputs 312, 315 from the circuitry 200 and process the inputs within the thread and channel exchange system 310 to produce an output 320, which may include appropriate notifications, indications, messaging communications (channel-based and/or thread-based), and/or display panes with the appropriate communication channels or threads in response. In some embodiments, the thread and channel exchange system 310 may execute context determination using the context determination module 314, process the data in an analytical engine 316, and output the results via a communications interface 318. Each of these steps may pull data from a plurality of sources including the communications database 300.

When inputs 312, 315 are received by the thread and channel exchange system 310, a context determination using the context determination module 314 may be made. A context determination includes such information as a user or group preference data, when and what user initiated receipt of the input (e.g., when and who selected the actuator that initiated the request), what type of input was provided (e.g., was a share request initiated or a thread request initiated) and under what circumstances was receipt of the input initiated (e.g., in what display pane was the input initiated). This information may give context to the thread and channel exchange system 310 analysis to determine the output. For example, the context determination module 314 may inform the thread and channel exchange system 310 as to the messaging communication information to output with a thread communication message or group-based messaging communication.

The thread and channel exchange system 310 may then compute the output using the analytical engine 316. The analytical engine 316 draws information about the applicable channel communication data, profile data, and thread communication data, etc. from the communications database 300 and then, in light of the context determination module's 314 determination, computes an output, which varies based on the input. The communications interface 318 then outputs 320 the output to the circuitry 200 for displaying on the selected group-based communication interface. For instance, the context determination module 314 may determine that a share request was received within a thread associated with a selected group-based communication channel by a certain user. Based on this information as well as the applicable channel communication data, profile data, and thread communication data, etc., the analytical engine 316 may determine an appropriate output, such as presenting the thread communication message along with the subsidiary channel-based thread communication in the associated channel messaging pane. The analytical engine 316 may also determine that certain thread indications should be updated to reflect the new thread communication message and present the thread communication message in the thread communication pane. Similarly, the context determination module 314 may determine that a follow request, an unfollow request, profile identifier, selected channel view request, search request, thread summary view request, etc. was received as well as any additional contextual information and the analytical engine 316 would determine the appropriate output based on this information as well as additional information from the communications database 300 as further described herein.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, communications database 300, and/or thread and channel exchange system 310 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Dynamic UI

Figure 4:
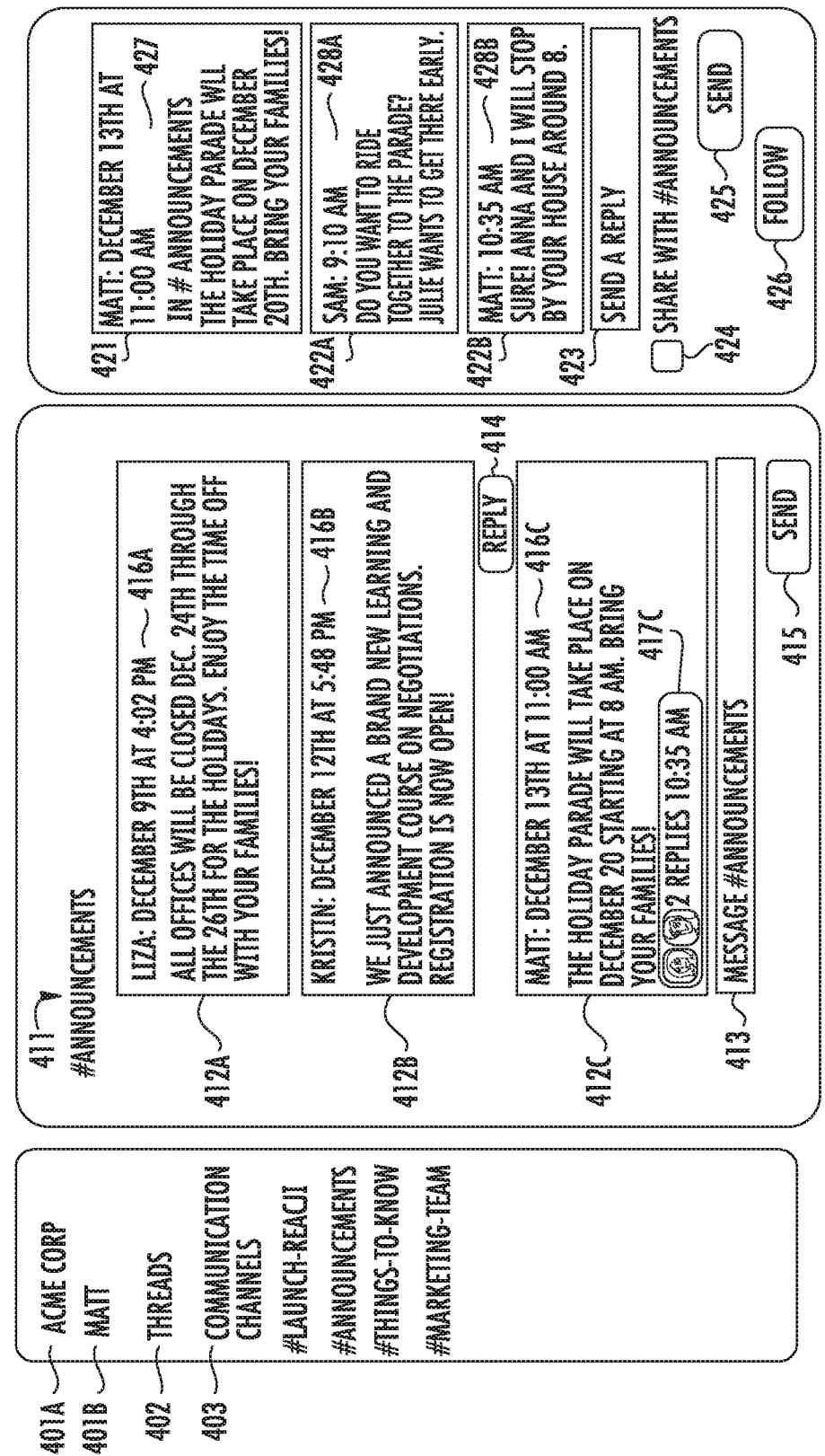
FIG. 4 illustrates an example group-based communication interface having a channel list pane, channel messaging pane, and thread communication pane in accordance with some embodiments discussed herein.

FIG. 4 illustrates an example group-based communication interface having a channel list pane, channel messaging pane, and thread communication pane in accordance with some embodiments discussed herein. The depicted group-based communication interface presents channel list pane 400, channel messaging pane 410, and thread communication pane 420. The channel list pane 400 includes a thread indication 402, communication channel indications 403 (e.g., identifying channels that the member follows), the name of the group 401A ("ACME Corp"), and the name of the particular member 401B ("Matt") viewing the interface. As shown in FIG. 4, the selected group-based communication interface may be configured to display the channel list pane, channel messaging pane, and thread communication pane simultaneously.

The channel messaging pane 410 includes a selected group-based communication channel 411 ("announcements") which includes a feed of group-based messaging communications 412A-412B. Each group-based messaging communication 412A-412B includes messaging communication information 416A-416B. The messaging communication information 416A-416B includes a profile identifier and the time and date of receipt of the respective group-based messaging communication. The channel messaging pane 410 may include other identifying information for the group-based communication channel (e.g., date of creation, time of last messaging communication, members of communication channel, etc.).

As shown in FIG. 4, the channel messaging pane 410 also includes a channel communication input register 413 and a channel messaging actuator 415. The channel communication input register 413 is configured to receive group-based messaging communications from a member to be displayed in the selected group-based communication channel displayed in the channel messaging pane 410. The channel messaging actuator 415 (e.g., a button) can be selected by a member and initiates transmission of the group-based messaging communication inserted into the channel communication input register 413 to the circuitry 200 for processing. The group-based messaging communication is then displayed in the channel messaging pane 410.

As also shown in FIG. 4, the channel messaging pane 410 includes a thread actuator 414. The thread actuator 414 is configured to initiate a thread request to create a thread in the thread communication pane 420. The thread actuator 414 shown in FIG. 4 is associated with the selected group-based messaging communication 412C; however, each group-based messaging communication of a group-based communication channel may have a thread actuator associated with the communication. Thus, threads can be created from any group-based messaging communication of a group-based communication channel in a channel messaging pane. In the embodiment illustrated in FIG. 4, the thread actuator 414 is displayed when a member touches or moves a cursor over the selected group-based messaging communication 412C. The thread actuator 414 can be selected to create a thread that will be presented in the thread communication pane 420. In the embodiment illustrated in FIG. 4, a thread has been created from the selected group-based messaging communication 412C (as shown for instance by the thread summary indicator 417C) that is displayed in the thread communication pane 420. The thread was initiated by a member selecting the thread actuator 414, which initiated a thread request. Should the member select the thread actuator 414 a second time, the thread would simply appear in the thread communication pane 420. Subsequent group-based messaging communications may include respective thread actuators, which upon selection create another thread. For instance, a second thread could be created from a second selected group-based messaging communication by selecting the respective thread actuator, initiating a thread request. In response to a second thread request, the second thread would be displayed in the thread communication pane 420 instead of the thread shown in FIG. 4. The second thread would only include the selected group-based messaging communication as a subsidiary channel-based thread communication until a thread communication message was received using the respective thread communication input register and thread messaging actuator.

In the embodiment illustrated in FIG. 4, the thread summary indicator 417C includes the number of thread communication messages received in the respective thread ("2 Replies") (i.e., the thread count), a profile identifier (e.g., avatar) associated with the member who submitted the thread communication message(s), and include a latency indicator ("10:35 AM") that indicates the time of receipt for the latest thread communication message in the thread. Such information can be beneficial to members of the group-based communication channel in determining whether to access and view the thread. A variety of information can be displayed in the thread summary indicators.

The thread summary indicator 417C can be configured as a selected thread view actuator to initiate a selected thread view request. The selected group-based communication interface is configured to receive selected thread view requests and in response to receipt of selected thread view requests, present a thread communication pane (e.g., thread communication pane 420) displaying the selected thread associated with the selected thread view request. For instance, in the embodiment illustrated in FIG. 4, thread summary indicator 417C is configured as a selected thread view actuator to initiate a selected thread view request upon selection by a member to view the full thread stemming from the selected group-based messaging communication 412C associated with the thread summary indicator 417C, as is shown in the thread communication pane 420.

Figure 12:
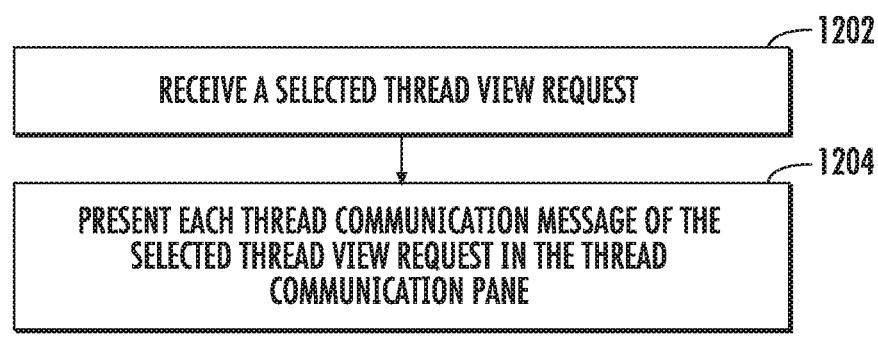
FIG. 12 illustrates a flow diagram of an example system in accordance with some embodiments discussed herein.

For instance, FIG. 12 illustrates a flow diagram of an example system in accordance with some embodiments discussed herein. In particular, the method 1200 of FIG. 12 involves the receipt of a selected thread view request. The method 1200 includes receiving a selected thread view request 1202 and in response to receipt of the selected thread view request 1202, presenting each thread communication message of the selected thread view request in the thread communication pane 1204.

The thread communication pane 420 includes a subsidiary channel-based thread communication 421 associated with the selected group-based messaging communication 412C of the group-based communication channel from which the displayed thread was created. The thread communication pane 420 also includes thread communication messages 422A-422B. Each of the thread communication messages 422A-422B and the subsidiary channel-based thread communication 421 includes messaging communication information 427 and 428A-428B. The messaging communication information 427 and 428A-428B includes a profile identifier and the time and/or date of receipt of the respective messaging communication. The messaging communication information 427 also includes the name of the group-based communication channel from which the thread was created (e.g., "announcements"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 4, selection of the name of the group-based communication channel (i.e., "announcements") from which the thread was created can be configured as a selected channel view actuator to initiate a selected channel view request to view the "announcements" channel, as is shown in the channel messaging pane 410. Various configurations of selected channel view actuator can be used to initiate selected channel view requests from the thread communication pane 420.

The thread communication pane 420 also includes a thread communication input register 423, a share actuator 424, a thread messaging actuator 425, and a follow/unfollow actuator 426. The thread communication input register 423 is configured to receive thread communication messages from a member. The thread messaging actuator 425 (e.g., a button) can be selected by a member and initiates transmission of the thread communication message inserted into the thread communication input register 423 to the circuitry 200 for processing. In some embodiments, the thread messaging actuator 425 may be hidden until a member enters information in the thread communication input register 423. The thread messaging actuator 425 may then be displayed and selected by a member. The thread communication message is then displayed in the thread communication pane 420.

Figure 9:
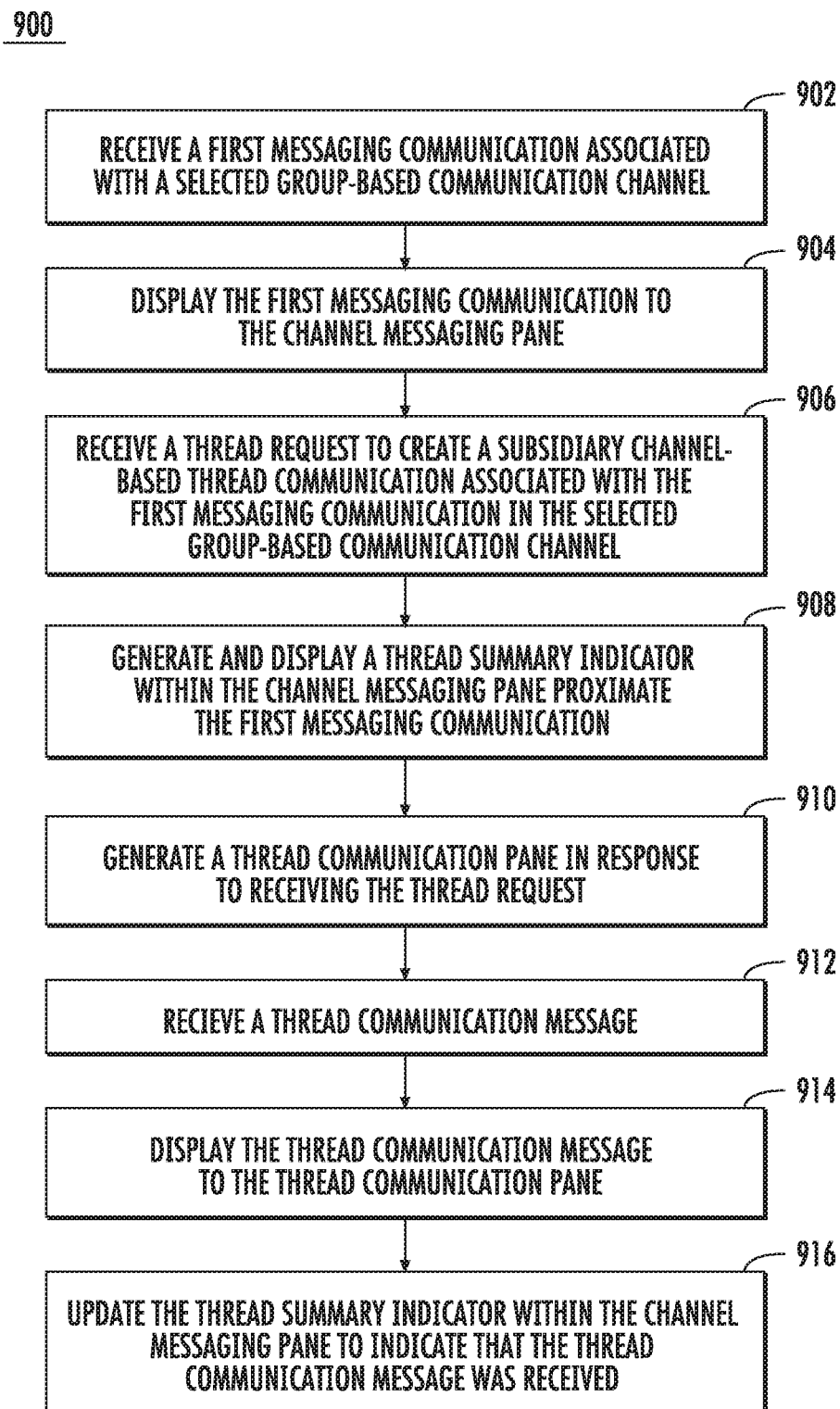
FIG. 9 illustrates a flow diagram of an example system in accordance with some embodiments discussed herein.

FIG. 9 illustrates a flow diagram of an example system in accordance with some embodiments discussed herein. The method illustrated in FIG. 9 involves the receipt of a thread request, the generation of the thread communication pane, and the generation of a thread summary indicator in the channel messaging pane indicating that the thread was created. In particular, the method 900 includes receiving a first messaging communication associated with a selected group-based communication channel 902; displaying the first messaging communication to the channel messaging pane 904; receiving a thread request to create a subsidiary channel-based thread communication associated with the first messaging communication in the selected group-based communication channel 906; generating and displaying a thread summary indicator within the channel messaging pane proximate the first messaging communication 908; and generating a thread communication pane in response to receiving the thread request 910. The method 900 may also include receiving a thread communication message 912; displaying the thread communication message to the thread communication pane 914; and updating the thread summary indicator within the change messaging pane to indicate that the thread communication message was received 916.

The follow/unfollow actuator 426 in the thread communication pane 420 is selectable by a member of the group-based communication channel from which the thread was created and initiates a request to either follow the respective thread or unfollow the respective thread. The selected group-based communication interface is configured such that a thread request (i.e., requesting the creation of a thread) initiates a follow request associated with the member who created the selected group-based messaging communication from which the thread was created and the member who initiated the thread request. Other members of the selected group-based communication channel from which the thread was created can follow the thread by selecting the follow/unfollow actuator 426. In other embodiments, as will be discussed in relation to FIG. 5 for instance, a profile identifier can be configured to initiate a follow request for the member associated with the profile identifier.

The group-based communication interface will present a thread indication (e.g., thread indication 402) in the channel list pane. In response to a follow request, the thread indication 402 is configured to indicate that the follow request was received. The group-based communication interface will update the thread summary communication pane to include the respective thread. The group-based communication interface will highlight the thread indication if new thread communication messages are received in the followed thread. The follow/unfollow actuator 426 may also be modified to display "unfollow" (e.g., as shown in FIG. 8) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 426 may also be modified to display "follow" in response to receiving the follow request (e.g., as shown in FIG. 4).

Figure 13:
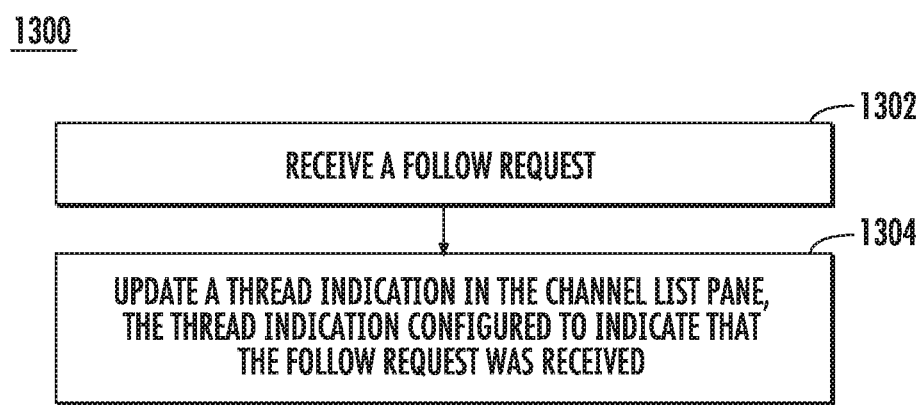
FIG. 13 illustrates a flow diagram of an example system in accordance with some embodiments discussed herein.

FIG. 13 illustrates a flow diagram of an example system in accordance with some embodiments discussed herein. In particular, FIG. 13 illustrates a method 1300 involving receipt of a follow request. The method 1300 includes receiving a follow request 1302 and updating a thread indication in the channel list pane, the thread indication configured to indicate that the follow request was received.

While not illustrated, the group-based communication interface is configured to allow a member to search for specific group-based communication channels and threads using a search actuator initiating a search request. In response to a search request, the group-based communication interface will display applicable group-based communication channels and/or threads. The group-based communication channels and/or threads can then be viewed in full by selecting a selected channel view actuator or selected channel view actuator, imitating the respective view request. The selected group-based communication channel may be displayed in a channel communication pane while a thread may be displayed in a thread communication pane.

In some embodiments, the selected group-based communication interface is configured to receive thread summary view requests in a thread summary communication pane. The member of the selected group-based communication interface can thereby view a summary of the threads that the member follows. For instance, FIG. 5 illustrates an example group-based communication interface having a channel list pane and a thread summary communication pane in accordance with some embodiments discussed herein. The channel list pane 500 includes a thread indication 502, communication channel indications 503 (e.g., identifying channels that the member follows), the name of the group 501A ("ACME Corp"), and the name of the particular member 501B ("Matt") viewing the interface.

In some embodiments, the thread indication 502 may be configured as a thread summary view actuator to initiate a thread summary view request. The selected group-based communication interface is configured to receive a thread summary view request and in response to receipt of the thread summary view request, present a thread summary communication pane 530 displaying a summary of each thread that the member follows. For instance, in the embodiment illustrated in FIG. 5, selection of the thread indication 502 (i.e., "Threads (1)") can be configured as a thread summary view actuator to initiate a thread summary view request to view a summary of each thread that the member ("Matt") follows, as is shown in the thread summary communication pane 530. Various configurations of thread summary view actuators can be used to initiate thread summary view requests from the channel list pane 500.

In the embodiment illustrated in FIG. 5, the thread indication 502 is bolded and includes "(1)" to indicate that a new thread communication message for the member's attention has been received. The thread indication 502 can be highlighted or marked in various ways to draw the member's attention to the thread. Once the new thread communication message is displayed by the selected group-based communication interface to the member, the bolded font or "(1)" may be removed.

The thread summary communication pane 530 displays a summary of the threads that the member follows. As shown in FIG. 5, for each thread summary, the thread summary communication pane 530 includes the name of the group-based communication channel from which the thread was created 531A-531B, the selected group-based messaging communication from which the thread was created 532A-532B, and thread communication messages received in the thread 532C-532E. For each thread summary, the thread summary communication pane 530 also includes a thread communication input register 533A-533B, a share actuator 534A-534B, and a thread messaging actuator 535A-535B. The thread communication input registers 533A-533B are configured to receive thread communication messages from a member. The thread messaging actuators 535A-535B (e.g., buttons) can be selected by a member and initiate transmission of the respective thread communication message inserted into the thread communication input register 533A-533B to the circuitry 200 for processing. The thread communication message is then displayed in the thread summary communication pane 530.

In the embodiment illustrated in FIG. 5, the thread summary communication pane 530 displays a summary of a thread from the "announcements" group-based communication channel and a summary of a thread from the "things-to-know" group-based communication channel. Each of the selected group-based messaging communications from which the respective thread was created 532A-532B and the thread communication messages received in the thread 532C-532E include messaging communication information 536A-536E. The messaging communication information 536A-536E includes a profile identifier and the time and/or date of receipt of the respective group-based messaging communication or thread communication message. The thread summary communication pane 530 may include other identifying information for each thread (e.g., members of communication channel, etc.). Each of the selected group-based messaging communications from which the respective thread was created 532A-532B includes a thread summary indicator 537A and 537B. In the embodiment illustrated in FIG. 5, the thread summary indicators 537A and 537B include the number of thread communication messages received in the thread (e.g., "2 Replies" or "1 Reply") (i.e., the thread count), a profile identifier (e.g., avatar) for each member who submitted thread communication message(s), and includes a latency indicator (e.g., "10:35 AM" or "9:35 AM") that indicates the time of receipt for the latest thread communication message in the respective thread. In this embodiment, the threads are ordered in reverse chronological order, displaying the thread with the most recent thread communication message first. The threads may be organized in a variety of manners in the thread summary communication pane 530. A variety of information can be displayed in the thread summary indicators.

As new thread communication messages are received, the selected group-based communication interface may present notifications regarding the receipt of thread communication messages. The notifications may appear in a specified display pane, which may appear when necessary or may always be present. For instance, a display pane may be presented to notify a user that a new thread communication message was received and may then be removed after a specified period of time. The notification in the display pane may be selected to initiate a request (e.g., to view the specific thread (selected thread view request) or view a summary of the new threads (thread summary view request)). Various forms of notifications may be presented to notify the user (via the client device) of the new thread communication message and may be configured as actuators to allow the user to initiate desired requests.

In the embodiment illustrated in FIG. 5, notification 538 is displayed in the thread summary communication pane 530. The notification 538 includes the number of new thread communication messages ("1 New Reply") and is associated with the thread in which the new thread communication message was received. The notification 538 can include any desired information regarding the receipt of new thread communication messages (e.g., date and time of new thread communication messages, profile identifier of member who submitted thread communication message, etc.). The notification 538 in the embodiment illustrated in FIG. 5 is configured as a thread reply view actuator that is configured to initiate a thread reply view request. The selected group-based communication interface is configured to receive thread reply view requests and in response, display the selected thread communication message associated with the thread reply view request. For instance, if a member were to select the notification 538 in FIG. 5, the selected group-based communication interface would, in response, display the selected thread communication message associated with the notification in place of the notification 538. The member could thereby view the selected thread communication message in the thread summary communication pane 530.

Additional notifications may be displayed in the thread summary communication pane 530, such as banners configured to indicate a variety of information (e.g., number of new thread communication messages received, time of last receipt, time of last display of thread summary communication pane). Further, in some embodiments, the selected group-based communication interface may be configured to display a banner separating new threads from already displayed threads. The thread summary communication pane 530 can also be refreshed by a member (e.g., by selecting a thread summary view actuator to initiate a thread summary view request) initiating the display of different notifications updated to indicate the latest information.

As noted above, the thread summary communication pane 530 includes the name of the group-based communication channel from which each thread was created (e.g., "announcements" and "things-to-know"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 5, selection of the name of the group-based communication channel (e.g., "announcements") from which the first thread was created can be configured as a selected channel view actuator to initiate a selected channel view request to view the "announcements" channel (e.g., as shown in FIG. 4 in the channel messaging pane 410). Various configurations of selected channel view actuators can be used to initiate selected channel view requests from the thread summary communication pane 530.

In the embodiment illustrated in FIG. 5, a profile identifier 539 is received in the thread communication message 532E ("@matt"). The profile identifier 539 is configured to initiate a follow request for the member associated with the profile identifier 539 if the member is a member of the selected group-based communication channel from which the thread was created. If the profile identifier is associated with a user that is not a member of the selected group-based communication, then a join request may be initiated to present an invitation to join the channel to the user.

In response to the follow request, the selected group-based communication interface generates and/or modifies a thread indication to indicate that a new thread communication message has been received for the member's attention. For instance, in the embodiment illustrated in FIG. 5, the profile identifier 539 was received in the thread communication message 532E, which initiated a follow request for the member ("Matt") associated with the profile identifier 539 ("@matt"). The thread indication 502 was highlighted to indicate that a new thread communication message (the thread communication message 532E) was received for the member's attention. Once the selected group-based communication interface displays the new thread communication message to the member, the highlight will be removed. However, the member is now following the thread. The member can unfollow the thread by selecting a follow/unfollow actuator as discussed with regards to FIG. 4 and for example shown in the thread communication pane 420 (see follow/unfollow actuator 426). The thread communication pane can be accessed from the thread summary communication pane 530 by selecting a selected thread view actuator, which initiates a selected thread view request. In response to the selected thread view request, the thread communication pane is displayed with the selected thread. For instance, in the embodiment illustrated in FIG. 5, thread summary indicators 537A and 537B can be configured to be selectable by a member, initiating a selected thread view request.

Figure 10:
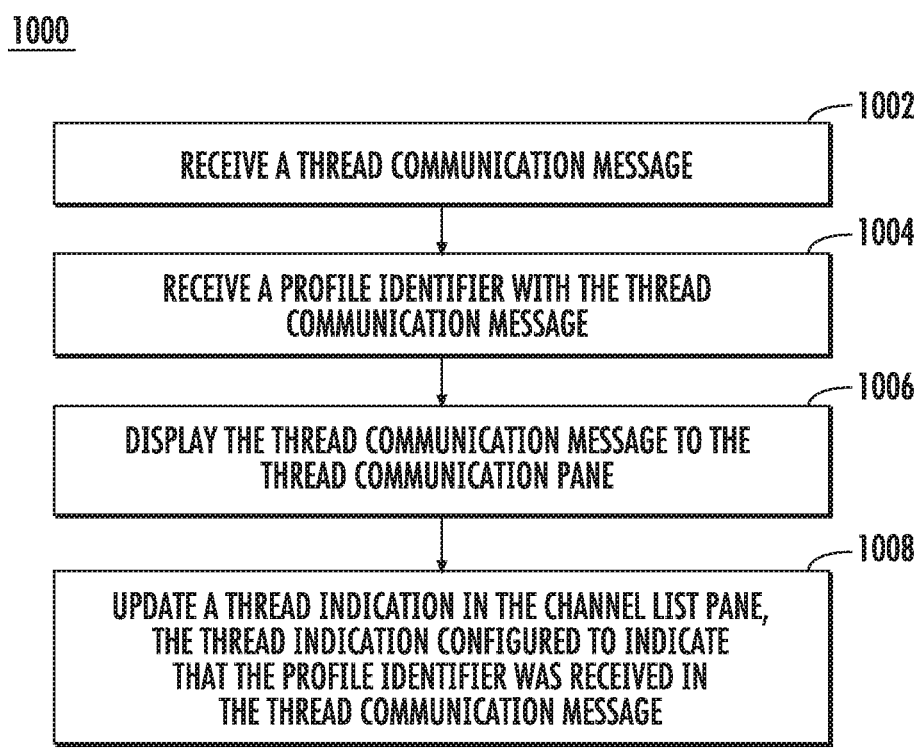
FIG. 10 illustrates a flow diagram of an example system in accordance with some embodiments discussed herein.

FIG. 10 illustrates a flow diagram of an example system in accordance with some embodiments discussed herein. In particular, FIG. 10 illustrates a method 1000 involving the receipt of a profile identifier. The method 1000 includes receiving a thread communication message 1002, receiving a profile identifier with the thread communication message 1004, displaying the thread communication message to the thread communication pane 1006, and updating a thread indication in the channel list pane, the thread indication configured to indicate that the profile identifier was received in the thread communication message.

Figure 6:
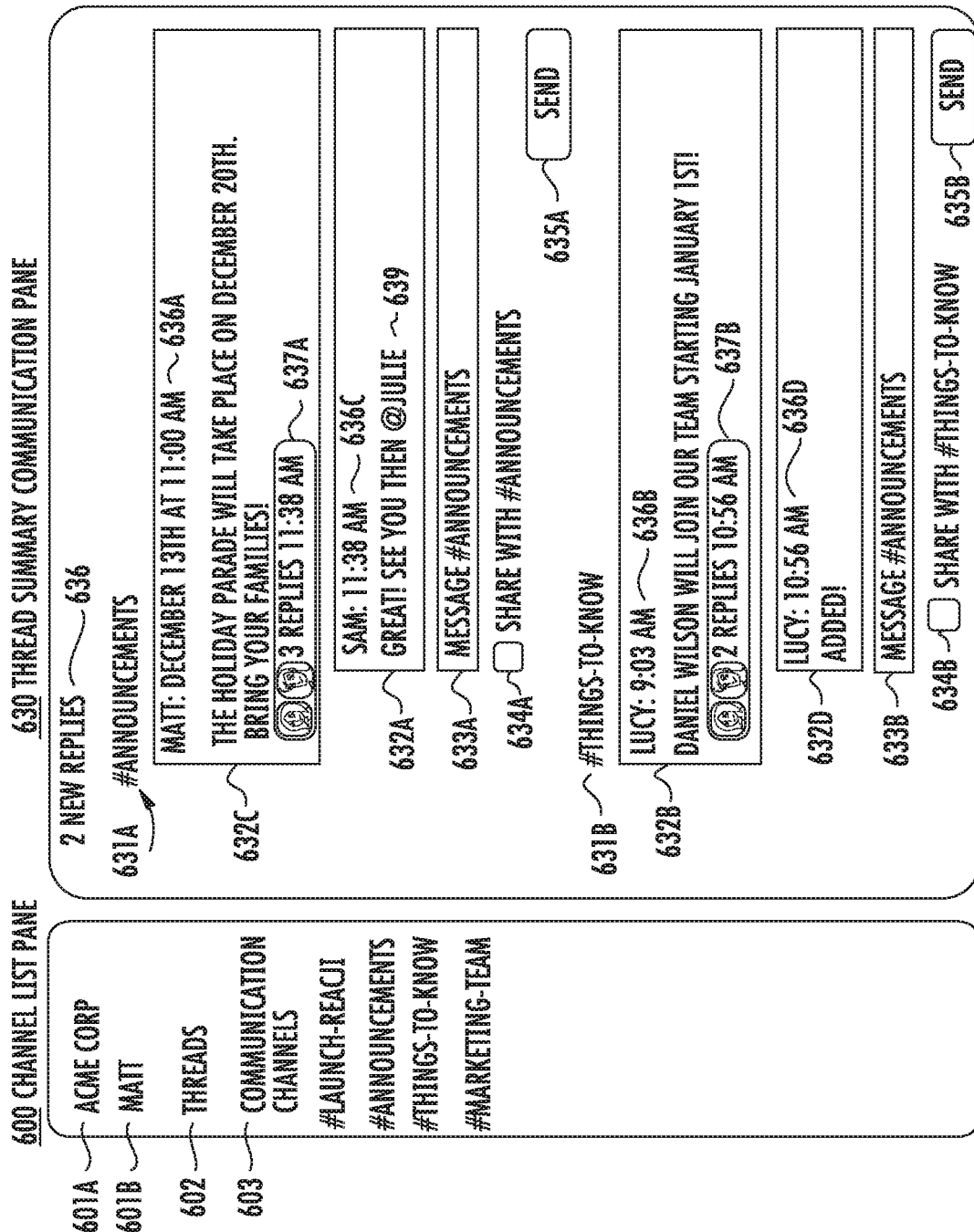
FIG. 6 illustrates an example group-based communication interface having a channel list pane and a thread summary communication pane in accordance with some embodiments discussed herein.

FIG. 6 illustrates an example group-based communication interface having a channel list pane 600 and a thread summary communication pane 630 in accordance with some embodiments discussed herein. The channel list pane 600 includes a thread indication 602, communication channel indications 603 (e.g., identifying channels that the member follows), the name of the group 601A ("ACME Corp"), and the name of the particular member 601B ("Matt") viewing the interface.

In some embodiments, the thread indication 602 may be configured as a thread summary view actuator to initiate a thread summary view request. The selected group-based communication interface is configured to receive a thread summary view request and in response to receipt of the thread summary view request, present a thread summary communication pane 630 displaying a summary of each thread that the member follows. For instance, in the embodiment illustrated in FIG. 6, selection of the thread indication 602 (i.e., "Threads") can be configured to initiate a thread summary view request to view a summary of each thread that the member ("Matt") follows, as is shown in the thread summary communication pane 630. Various configurations of thread summary view actuators can be used to initiate thread summary view requests from the channel list pane 600.

In the embodiment illustrated in FIG. 6, the thread indication 602 is bolded to indicate that one or more new thread communication messages for the member's attention have been received. The thread indication 602 can be highlighted or marked in various ways to draw the member's attention to the thread. Once the new thread communication message is displayed by the selected group-based communication interface to the member, the bolded font may be removed.

The thread summary communication pane 630 displays a summary of the threads that the member follows. As shown in FIG. 6, for each thread summary, the thread summary communication pane 630 includes the name of the group-based communication channel from which the thread was created 631A-631B, the selected group-based messaging communication from which the thread was created 632A-632B, and thread communication messages received in the thread 632C-632D. For each thread summary, the thread summary communication pane 630 also includes a thread communication input register 633A-633B, a share actuator 634A-634B, and a thread messaging actuator 635A-635B. The thread communication input registers 633A-633B are configured to receive thread communication messages from a member. The thread messaging actuators 635A-635B (e.g., buttons) can be selected by a member and initiate transmission of the respective thread communication message inserted into the thread communication input register 633A-633B to the circuitry 200 for processing. The thread communication message is then displayed in the thread summary communication pane 630.

In the embodiment illustrated in FIG. 6, the thread summary communication pane 630 displays a summary of a thread from the "announcements" group-based communication channel and a summary of a thread from the "things-to-know" group-based communication channel. Each of the selected group-based messaging communication from which the respective thread was created 632A-632B and the thread communication messages received in the thread 632C-632D include messaging communication information 636A-636D. The messaging communication information 636A-636D includes a profile identifier and the time and/or date of receipt of the respective group-based messaging communication or thread communication message. The thread summary communication pane 630 may include other identifying information for each thread (e.g., members of communication channel, etc.). Each of the selected group-based messaging communications from which the respective thread was created 632A-632B includes a thread summary indicator 637A and 637B. In the embodiment illustrated in FIG. 6, the thread summary indicators 637A and 637B include the number of thread communication messages received in the thread (e.g., "3 Replies" or "2 Replies") (i.e., the thread count), a profile identifier (e.g., avatar) for each member who submitted a thread communication message(s), and include a latency indicator (e.g., "11:38 AM" or "10:56 AM") that indicates the time of receipt for the latest thread communication message in the respective thread. A variety of information can be displayed in the thread summary indicators.

As noted above, the thread summary communication pane 630 includes the name of the group-based communication channel from which each thread was created (e.g., "announcements" and "things-to-know"). In some embodiments, the name of the group-based communication channel can be configured as a selected channel view actuator to initiate a selected channel view request. The selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 6, selection of the name of the group-based communication channel (e.g., "announcements") from which the first thread was created can be configured to initiate a selected channel view request to view the "announcements" channel (e.g., as shown in FIG. 4 in the channel messaging pane 410). Various configurations of selected channel view actuators can be used to initiate selected channel view requests from the thread summary communication pane 630.

In the embodiment illustrated in FIG. 6, a profile identifier 639 is received in the thread communication message 632C ("@julie"). The profile identifier 639 is configured to initiate a follow request for the member associated with the profile identifier 639. In response to the follow request, the selected group-based communication interface generates and/or modifies a thread indication to indicate that a new thread communication message has been received for the member's attention. For instance, in the embodiment illustrated in FIG. 6, the profile identifier 639 was received in the thread communication message 632C, which initiated a follow request for the member ("Julie") associated with the profile identifier 639 ("@julie"). The thread indication for the member would then be highlighted to indicate that a new thread communication message (the thread communication message 632C) was received for the member's attention.

As explained with regards to FIG. 5, the thread communication pane can be accessed from the thread summary communication pane by selecting a selected thread view actuator, which initiates a selected thread view request. In response to the selected thread view request, the thread communication pane is displayed with the selected thread. For instance, in the embodiment illustrated in FIG. 6, thread summary indicators 637A and 637B can be configured to be selectable by a member, initiating a selected thread view request.

In the embodiment illustrated in FIG. 6, notification 636 is displayed in the thread summary communication pane 630. The notification 636 includes the number of new thread communication messages ("2 replies") and may also include the number of new threads (e.g., "2 new threads"). The notification 636 can include any desired information regarding the receipt of new thread communication messages (e.g., date and time of new thread communication messages, names of group-based communication channels from which the threads were created, etc.). The new threads can refer to threads in which the member has been associated with through a profile identifier and/or threads created from selected group-based messaging communications that the member authored (that is, the member authored the selected group-based messaging communication). The new thread communication messages can similarly refer to thread communication messages received in threads the member follows and/or thread communication messages in which the member has been associated with through a profile identifier. Referring back to FIG. 5, the particular member "Matt" was associated with the thread communication message 532E with the receipt of the profile identifier 539. Accordingly, a notification would notify the member of a new thread and a new thread communication message.

Figure 7:
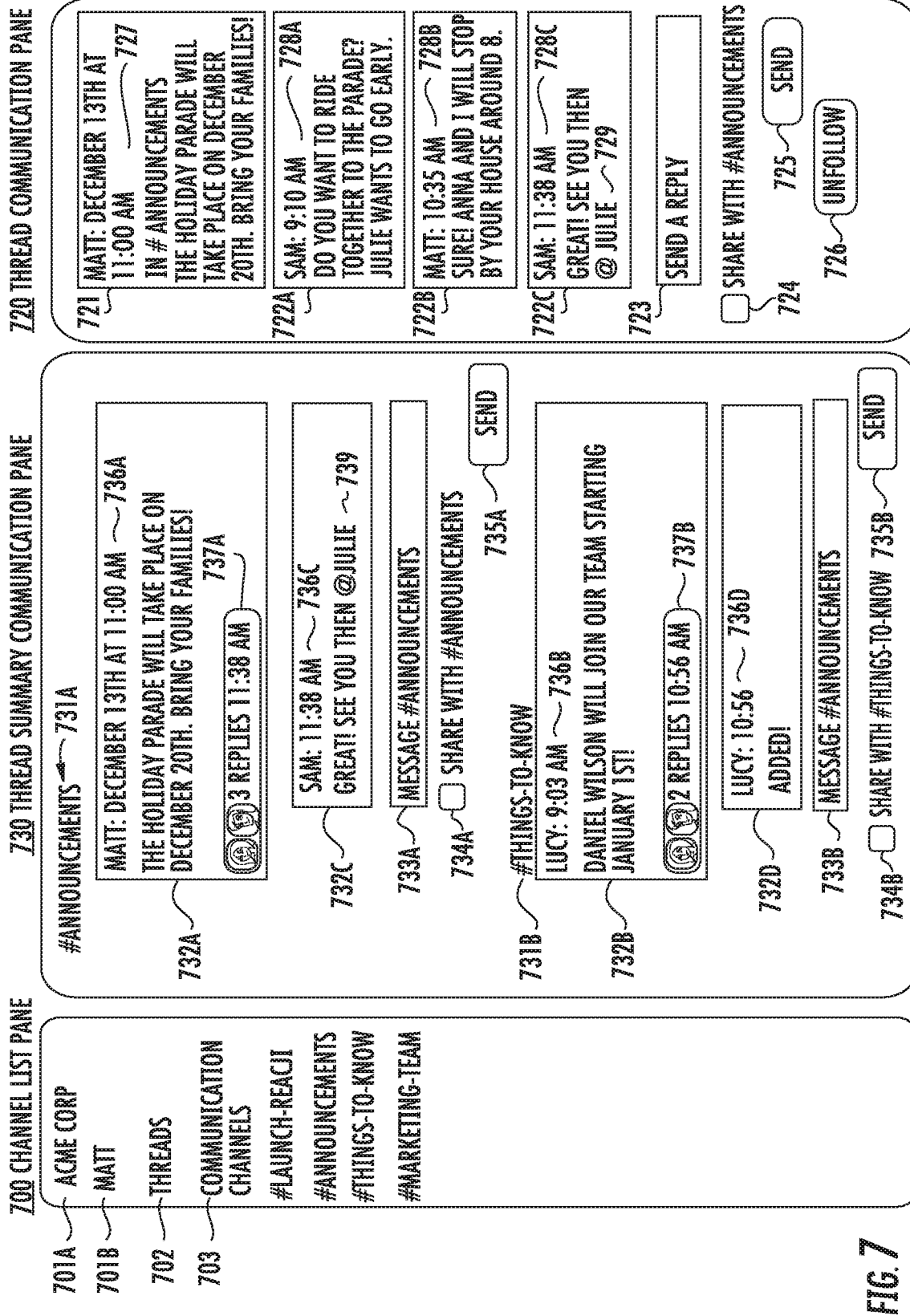
FIG. 7 illustrates an example group-based communication interface having a channel list pane, a thread summary communication pane, and a thread communication pane in accordance with some embodiments discussed herein.

FIG. 7 illustrates an example group-based communication interface having a channel list pane, a thread summary communication pane, and a thread communication pane in accordance with some embodiments discussed herein. The channel list pane 700 includes a thread indication 702, communication channel indications 703 (e.g., identifying channels that the member follows), the name of the group 701A ("ACME Corp"), and the name of the particular member 701B ("Matt") viewing the interface.

In some embodiments, the thread indication 702 may be configured as a thread summary view actuator to initiate a thread summary view request. The selected group-based communication interface is configured to receive a thread summary view request and in response to receipt of the thread summary view request, present a thread summary communication pane 730 displaying a summary of each thread that the member follows. For instance, in the embodiment illustrated in FIG. 7, selection of the thread indication 702 (i.e., "Threads") can be configured as a thread summary view actuator to initiate a thread summary view request to view a summary of each thread that the member ("Matt") follows, as is shown in the thread summary communication pane 730. Various configurations of thread summary view actuators can be used to initiate thread summary view requests from the channel list pane 700.

In the embodiment illustrated in FIG. 7, the thread indication 702 is not bolded since the new thread communication messages have been displayed by the selected group-based communication interface to the member.

The thread summary communication pane 730 displays a summary of the threads that the member follows. As shown in FIG. 7, for each thread summary, the thread summary communication pane 730 includes the name of the group-based communication channel from which the thread was created 731A-731B, the selected group-based messaging communication from which the thread was created 732A-732B, and thread communication messages received in the thread 732C-732D. For each thread summary, the thread summary communication pane 730 also includes a thread communication input register 733A-733B, a share actuator 734A-734B, and a thread messaging actuator 735A-735B. The thread communication input registers 733A-733B are configured to receive thread communication messages from a member. The thread messaging actuators 735A-735B (e.g., buttons) can be selected by a member and initiate transmission of the respective thread communication message inserted into the thread communication input register 733A-733B to the circuitry 200 for processing. The thread communication message is then displayed in the thread summary communication pane 630.

In the embodiment illustrated in FIG. 7, the thread summary communication pane 730 displays a summary of a thread from the "announcements" group-based communication channel and a summary of a thread from the "things-to-know" group-based communication channel. Each of the selected group-based messaging communication from which the respective thread was created 732A-732B and the thread communication messages received in the thread 732C-732D include messaging communication information 736A-736D. The messaging communication information 736A-736D includes a profile identifier and the time and/or date of receipt of the respective group-based messaging communication or thread communication message. The thread summary communication pane 730 may include other identifying information for each thread (e.g., members of communication channel, etc.). Each of the selected group-based messaging communications from which the respective thread was created 732A-732B includes a thread summary indicator 737A and 737B. In the embodiment illustrated in FIG. 7, the thread summary indicators 737A and 737B include the number of thread communication messages received in the thread (e.g., "3 Replies" or "2 Replies") (i.e., the thread count), a profile identifier (e.g., avatar) for each member who submitted a thread communication message(s), and include a latency indicator (e.g., "11:38 AM" or "10:56 AM") that indicates the time of receipt for the latest thread communication message in the respective thread. A variety of information can be displayed in the thread summary indicators.

As noted above, the thread summary communication pane 730 includes the name of the group-based communication channel from which each thread was created (e.g., "announcements" and "things-to-know"). In the embodiment illustrated in FIG. 7 the name of the group-based communication channel can be configured as a selected channel view actuator to initiate a selected channel view request. For instance, in the embodiment illustrated in FIG.

7, selection of the name of the group-based communication channel (e.g., "announcements") from which the first thread was created can be configured as a selected channel view actuator to initiate a selected channel view request to view the "announcements" channel (e.g., as shown in FIG. 4 in the channel messaging pane 410). Various configurations of selected channel view actuators can be used to initiate selected channel view requests from the thread summary communication pane 730.

In the embodiment illustrated in FIG. 7, a profile identifier 739 is received in the thread communication message 732C ("@julie"). Similar to the embodiment illustrated in FIG. 6, the profile identifier 739 is configured to initiate a follow request for the member associated with the profile identifier 739. In response to the follow request, the selected group-based communication interface generates and/or modifies a thread indication to indicate that a new thread communication message has been received for the member's attention.

As explained with regards to FIG. 5, the thread communication pane can be accessed from the thread summary communication pane by selecting a selected thread view actuator, which initiates a selected thread view request. In response to the selected thread view request, the thread communication pane is displayed with the selected thread. For instance, in the embodiment illustrated in FIG. 7, thread summary indicators 737A has been selected, initiating a selected thread view request. In response to receipt of the selected thread view request, the selected thread is displayed in the thread communication pane 720.

The thread communication pane 720 includes a subsidiary channel-based thread communication 721 associated with the selected group-based messaging communication 732A displayed in the thread summary communication pane 730. The thread communication pane 720 also includes thread communication messages 722A-722C. Each of the thread communication messages 722A-722C and the subsidiary channel-based thread communication 721 includes messaging communication information 727 and 728A-728C. The messaging communication information 727 and 728A-728C includes a profile identifier and the time and/or date of receipt of the respective messaging communication. The messaging communication information 727 also includes the name of the group-based communication channel from which the thread was created (e.g., "announcements"). In some embodiments, the name of the group-based communication channel can be configured as a selected channel view actuator to initiate a selected channel view request to view a channel messaging pane displaying the selected group-based communication channel associated with the selected channel view request.

The thread communication pane 720 also includes a thread communication input register 723, a share actuator 724, a thread messaging actuator 725, and a follow/unfollow actuator 726. The thread communication input register 723 is configured to receive thread communication messages from a member. The thread messaging actuator 725 (e.g., a button) can be selected by a member and initiates transmission of the thread communication message inserted into the thread communication input register 723 to the circuitry 200 for processing. The thread communication message is then displayed in the thread communication pane 720.

Similar to the embodiment illustrated in FIG. 4, the follow/unfollow actuator 426 is selectable by a member of the group-based communication channel from which the thread was created and initiates a request to either follow the respective thread or unfollow the respective thread. In response to a follow request, the thread indication (e.g., thread indication 702) in the channel list pane is configured to indicate that the follow request was received. The group-based communication interface will update the thread summary communication pane to include the respective thread. The group-based communication interface will highlight the thread indication if new thread communication messages are received in the followed thread. The follow/unfollow actuator 726 may also be modified to display "unfollow" (e.g., as shown in FIG. 7) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 726 may also be modified to display "follow" in response to receiving the follow request (e.g., as shown in FIG. 4).

Figure 11:
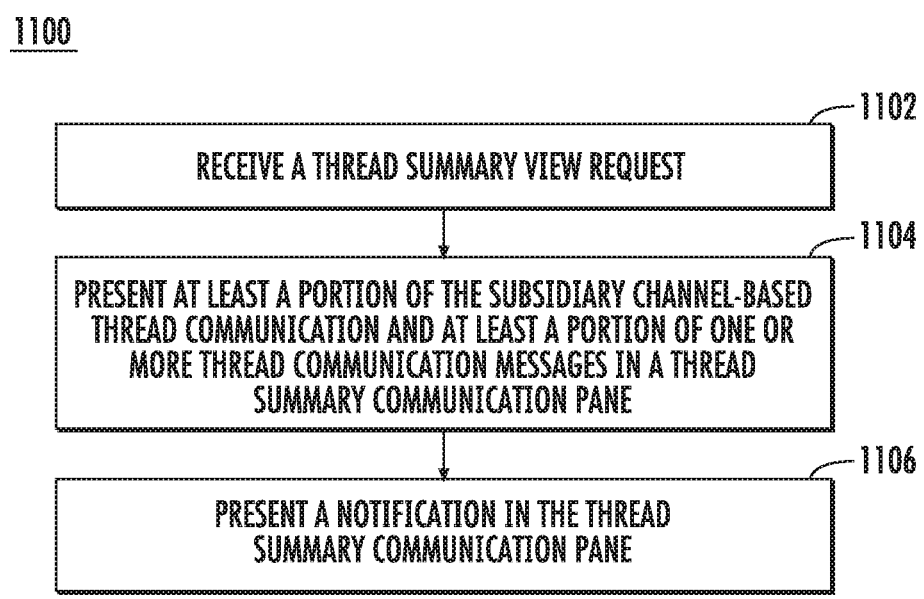
FIG. 11 illustrates a flow diagram of an example system in accordance with some embodiments discussed herein.

FIG. 11 illustrates a flow diagram of an example system in accordance with some embodiments discussed herein. The method 1100 illustrated in FIG. 11 involves the receipt of a thread summary view request and the subsequent display of a summary of the threads and/or notifications regarding the threads. In particular, the method 1100 includes receiving a thread summary view request 1102 and presenting at least a portion of the subsidiary channel-based thread communication and at least a portion of one or more thread communication messages in a thread summary communication pane 1104. The method 1100 may also include presenting a notification in the thread summary communication pane 1106, though this is optional and may depend on whether a new thread communication message has been received for the member's attention.

In some embodiments, it may be beneficial to notify the members of a selected group-based communication channel of certain communications in a thread stemming from that selected group-based communication channel. For instance, members of a selected group-based communication channel may reach a decision on a topic in a thread that is relevant to other members of the selected group-based communication channel. The members participating in the thread can share the relevant communications to the selected group-based communication channel to quickly identify information that the other members of the selected group-based communication channel need to be made aware. For instance, FIG. 8 illustrates an example group-based communication interface having a channel list pane, a channel messaging pane, and a thread communication pane in accordance with some embodiments discussed herein. In particular, FIG. 8 illustrates a group-based communication interface having a channel list pane 800, channel messaging pane 810, and thread communication pane 820. The channel list pane 800 includes a thread indication 802, communication channel indications 803 (e.g., identifying channels that the member follows), the name of the group 801A ("ACME Corp"), and the name of the particular member 801B ("Matt").

The channel messaging pane 810 includes a selected group-based communication channel 811 ("announcements") which includes a feed of group-based messaging communications 812A-812B. Each group-based messaging communication 812A-812B includes messaging communication information 816A-816B. The messaging communication information 816A-816B includes a profile identifier and the time and date of receipt of the respective group-based messaging communication. The channel messaging pane 810 also shows the name of the selected group-based communication channel 811 and may include other identifying information for the group-based communication channel (e.g., date of creation, time of last messaging communication, members of communication channel, etc.). Both group-based messaging communications 812A-812B have had threads stem from the communications. Accordingly, each group-based messaging communication 812A-812B has a thread summary indicator 817A-817B, respectively, attached to the communications. In the embodiment illustrated in FIG. 8, the thread summary indicators 817A and 817B include the number of thread communication messages received in the thread (e.g., "3 Replies" or "5 Replies") (i.e., the thread count), a profile identifier (e.g., avatar) for each member who submitted a thread communication message(s), and include a latency indicator (e.g., "11:38 AM" or "11:56 AM") that indicates the time of receipt for the latest thread communication message in the respective thread. The thread summary indicators 817A-817B can be configured as selected thread view actuators to initiate a selected thread view request. As noted previously, the selected group-based communication interface is configured to receive selected thread view requests and in response to receipt of selected thread view requests, present a thread communication pane displaying the selected thread associated with the selected thread view request. For instance, in the embodiment illustrated in FIG. 8, selection of either of the thread summary indicators 817A-817B can be configured as a selected thread view actuator to initiate a selected thread view request to view the full thread stemming from the selected group-based messaging communication associated with the respective thread summary indicator.

The thread communication pane 820 includes a subsidiary channel-based thread communication 821 associated with the respective group-based messaging communication of the group-based communication channel from which the displayed thread was created. The thread communication pane 820 also includes thread communication messages 822A-822B. Each of the thread communication messages 822A-822B and the subsidiary channel-based thread communication 821 includes messaging communication information 827 and 828A-828B. The messaging communication information 827 and 828A-828B includes a profile identifier and the time of receipt of the respective group-based messaging communication. The messaging communication information 827 also includes the name of the group-based communication channel from which the thread was created. In some embodiments, the name of the group-based communication channel can be configured as a selected channel view actuator to initiate a selected channel view request. As noted previously, the selected group-based communication interface is configured to receive selected channel view requests and in response to receipt of selected channel view requests, present a channel messaging pane displaying the selected group-based communication channel associated with the selected channel view request. For instance, in the embodiment illustrated in FIG. 8, selection of the name of the group-based communication channel from which the thread was created can be configured as a selected channel view actuator to initiate a selected channel view request to view the "announcements" channel. Various configurations of selected channel view actuators can be used to initiate selected channel view requests from the thread communication pane 820.

The thread communication pane 820 also includes a thread communication input register 823, a share actuator 824, a thread messaging actuator 825, and an follow/unfollow actuator 826. The thread communication input register 823 is configured to receive thread communication messages from a member. The thread messaging actuator 825 (e.g., a button) can be selected by a member and initiates transmission of the thread communication message inserted into the thread communication input register 823 to the circuitry 200 for processing. The thread communication message is then displayed in the thread communication pane 820.

The follow/unfollow actuator 826 is also selectable by a member of the group-based communication channel from which the thread was created and initiates a request to either follow the respective thread or unfollow the respective thread. In response to a follow request, the group-based communication interface will update a thread indication (e.g., thread indication 802) in the channel list pane, where the thread indication is configured to indicate that the follow request was received. The group-based communication interface will highlight the thread indication if new thread communication messages are received in the followed thread. The follow/unfollow actuator 826 may also be modified to display "unfollow" (as shown in FIG. 8) in response to receiving the follow request. In response to an unfollow request, the group-based communication interface will modify the thread indication in the channel list pane by updating the thread summary communication pane to remove the respective thread. The group-based communication interface will no longer highlight the thread indication if new thread communication messages are received in the unfollowed thread. The follow/unfollow actuator 826 may also be modified to display "follow" in response to receiving the follow request.

In the embodiment illustrated in FIG. 8, thread communication message 822B has been shared (or "broadcasted") to the group-based communication channel from which the thread was created. The share actuator 824 was selected by a member of the group-based communication channel, which initiated a share request. In response to the share request, the selected thread communication message 822B was reproduced in the channel messaging pane 810 displaying the selected group-based communication channel as shared thread communication message 818B. The subsidiary channel-based thread communication 821 was also reproduced as shared thread communication message 818A to provide context to the shared communication. The two shared thread communication messages 818A and 818B may be distinguished in the channel messaging pane 810 by a share indicator 818 and/or by changes in format (e.g., by off-setting the communications such as shown in FIG. 8 or other ways of distinguishing the communications). The shared thread communication messages 818A and 818B include messaging communication information 819A and 819B. The messaging communication information 819A-819B include a profile identifier and the time and/or date of receipt of the respective communication. A thread summary indicator 817C is also included with the shared thread communication message 818A. In the embodiment illustrated in FIG. 8, the thread summary indicator 817C includes the number of thread communication messages received in the thread (e.g., "2 Replies") (i.e., the thread count), a profile identifier (e.g., avatar) for each member who submitted a thread communication message(s), and includes a latency indicator (e.g., "1:34 PM") that indicates the time of receipt for the latest thread communication message in the respective thread. The thread summary indicator 817C can be configured as a selected thread view actuator to initiate a selected thread view request to view the full thread.

While not illustrated in FIG. 8, the channel messaging pane 810 may also include a channel communication input register and a channel messaging actuator, as described herein. The channel list pane 800, channel messaging pane 810, and thread communication pane 820 may also include other actuators, indicators, and messaging communication information without deviating from the intent of the present invention.

Figure 14:
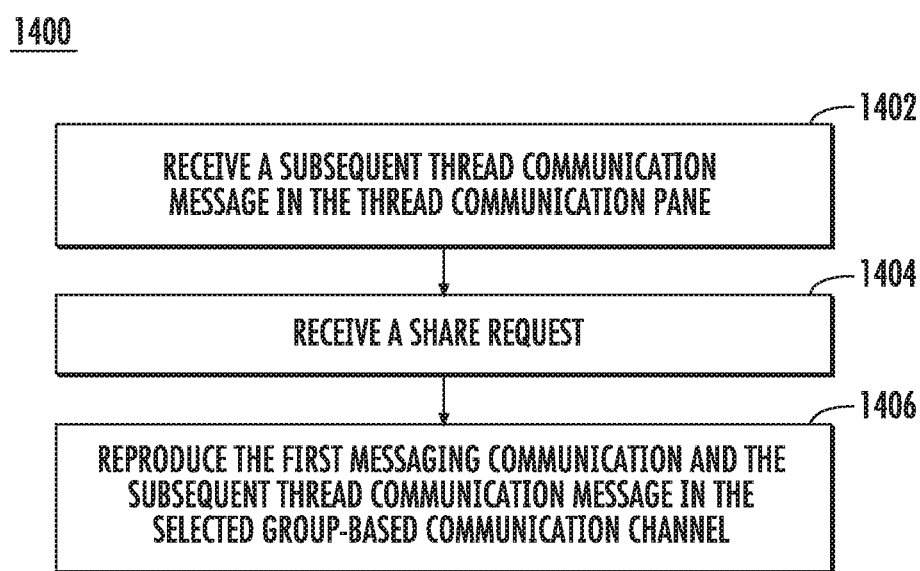
FIG. 14 illustrates a flow diagram of an example system in accordance with some embodiments discussed herein.

FIG. 14 illustrates a flow diagram of an example system in accordance with some embodiments discussed herein. In particular, FIG. 14 illustrates a method of sharing thread communication messages back to the selected group-based communication channel from which the thread was created. The method 1400 includes receiving a subsequent thread communication message in the thread communication pane 1402, receiving a share request 1404, and in response to receiving the share request, reproducing the first messaging communication and the subsequent thread communication message in the selected group-based communication channel 1406. Other members of the selected group-based communication channel can then access the thread by selecting a thread summary indicator, initiating a selected thread view request to view the full thread. In response to the selected thread view request, the selected group-based communication interface then presents each thread communication message of the selected thread in the thread communication pane (see e.g., FIG. 12).

Some embodiments of the present invention also use a second screen, as discussed herein. For instance, a first screen may be presented to a first member while a second screen may be presented to a second member of the selected group-based communication interface. The format of a display pane, group-based communication channel, or thread may appear differently to different members of the interface; however, the content of a selected group-based communication channel (i.e., messaging communications) and thread stemming from that selected group-based communication channel will be displayed to each member of the channel. For instance, members or groups may have particular preference for layouts or text fonts. The particular preferences may be considered when generating the group-based communication channels and threads. The system may utilize any number of screens necessary to present the group-based communication interface in a meaningful way to each member of the interface.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for generating a group-based communication interface within a defined display window of a user client device, the group-based communication interface defining a channel list pane comprising a plurality of group-based communication channels and a channel messaging pane, the apparatus comprising at least a processor, and a memory associated with the processor having computer coded instructions therein, with the computer coded instructions configured to, when executed by the processor, cause the apparatus to:

receive a first messaging communication associated with a selected group-based communication channel of the plurality of group-based communication channels, the selected group-based communication channel comprising a plurality of messaging communications;

cause the first messaging communication to be rendered within the channel messaging pane;

receive, from the user client device, a thread request to create a subsidiary channel-based thread communication, wherein the thread request is associated with the first messaging communication in the selected group-based communication channel;

in response to receiving the thread request, generate and transmit for display a thread summary indicator renderable within the channel messaging pane proximate the first messaging communication, wherein the thread summary indicator is configured to be selectable by any user of the selected group-based communication channel;

receive an indication of an input indicating a selection of the thread summary indicator; and cause, based at least in part on receiving the indication of the input, rendering of the subsidiary channel-based thread communication to a thread communication pane within the group-based communication interface, wherein the thread communication pane is separate from the channel list pane and the channel messaging pane within the group-based communication interface, wherein the channel list pane, the channel messaging pane, and the thread communication pane are configured to be rendered within the defined display window as viewable simultaneously, and wherein content of the thread communication pane is particular to the first messaging communication.

2. The apparatus of claim 1, wherein the computer coded instructions are further configured to, when executed by the processor, cause the apparatus to:

cause a thread actuator to be rendered within the channel messaging pane proximate the first messaging communication, wherein the thread request comprises user selection of the thread actuator; and receive, after receiving the user selection of the thread actuator, a thread communication message, wherein the thread communication message is rendered within the thread communication pane.

3. The apparatus of claim 2, wherein the computer coded instructions are further configured to, when executed by the processor, cause the apparatus to:

in response to receiving the thread communication message, update the thread summary indicator within the channel messaging pane to indicate that the thread communication message was received.

4. The apparatus of claim 1, wherein the computer coded instructions are further configured to, when executed by the processor, cause the apparatus to:

cause messaging communication information associated with the subsidiary channel-based thread communication to be rendered within the thread communication pane, wherein the messaging communication information is particular to the first messaging communication.

5. The apparatus of claim 1, wherein the computer coded instructions are further configured to, when executed by the processor, cause the apparatus to:

receive a thread communication message, wherein the thread communication message is rendered within the thread communication pane and wherein the thread communication message is associated with a profile identifier, wherein the profile identifier is configured to associate the thread communication message with a user of the selected group-based communication channel; and in response to receiving the thread communication message and the profile identifier, update a thread indication within the channel list pane, the thread indication indicating that the profile identifier was received in the thread communication message.

6. The apparatus of claim 1, wherein the computer coded instructions are further configured to, when executed by the processor, cause the apparatus to:

receive a thread summary view request; and in response to receiving the thread summary view request, cause at least a portion of the subsidiary channel-based thread communication and at least a portion of one or more thread communication messages to be rendered within a thread summary communication pane.

7. The apparatus of claim 6, wherein the computer coded instructions are further configured to, when executed by the processor, cause the apparatus to:

in response to receiving the thread summary view request, cause a notification to be rendered within the thread summary communication pane, wherein the notification indicates receipt of new thread communication messages that have not yet been rendered for viewing by a thread-associated user profile.

8. The apparatus of claim 1, wherein the indication of the input indicating the selection of the thread summary indicator is a selected thread view request, and wherein the computer coded instructions are further configured to, when executed by the processor, cause the apparatus to:

in response to receiving the selected thread view request, cause the first messaging communication and one or more thread communication messages particular to the first messaging communication to be rendered within the thread communication pane.

9. The apparatus of claim 1, wherein the computer coded instructions are further configured to, when executed by the processor, cause the apparatus to:

receive a follow request that is configured to activate notifications corresponding to the subsidiary channel-based thread communication; and in response to receiving the follow request, update a thread indication within the channel list pane, the thread indication indicating that the follow request was received.

10. The apparatus of claim 1, wherein the computer coded instructions are further configured to, when executed by the processor, cause the apparatus to:

receive a thread communication message in the thread communication pane, wherein the thread communication message is rendered within the thread communication pane;

receive a share request associated with the thread communication message in the thread communication pane; and in response to receiving the share request, cause the thread communication message to be rendered within the channel messaging pane.

11. The apparatus of claim 10, wherein the computer coded instructions are further configured to, when executed by the processor, cause the apparatus to:

receive a selected thread view request associated with the thread communication message rendered in the channel messaging pane; and in response to receiving the selected thread view request associated with the thread communication message rendered in the channel messaging pane, cause the thread communication message to be rendered within the thread communication pane.

12. The apparatus of claim 1, wherein the thread summary indicator indicates that the subsidiary channel-based thread communication is associated with the first messaging communication of the plurality of messaging communications, and further wherein the thread summary indicator comprises a thread count and a latency indicator.

13. The apparatus of claim 1, wherein the computer coded instructions are further configured to, when executed by the processor, cause the apparatus to:

cause a first message input register to be rendered within the thread communication pane, the first message input register configured to receive a new thread communication message associated with the subsidiary channel-based thread communication, the first message input register being different than a second message input register rendered within the channel messaging pane.

14. The apparatus of claim 13, wherein the first message input register within the thread communication pane and the second message input register within the channel messaging pane are configured to be rendered within the defined display window as viewable simultaneously.

15. A computer program product for generating a group-based communication interface within a defined display window of a user client device, the group-based communication interface defining a channel messaging pane and a channel list pane comprising a plurality of group-based communication channels, the computer program product comprising a non-transitory computer readable medium having computer program instructions stored therein, said computer program instructions when executed by a processor cause the computer program product to:

receive a first messaging communication associated with a selected group-based communication channel of the plurality of group-based communication channels, the selected group-based communication channel comprising a plurality of messaging communications;

cause the first messaging communication to be rendered within the channel messaging pane;

receive, from the user client device, a thread request to create a subsidiary channel-based thread communication, wherein the thread request is associated with the first messaging communication in the selected group-based communication channel;

in response to receiving the thread request, generate and transmit for display a thread summary indicator renderable within the channel messaging pane proximate the first messaging communication, wherein the thread summary indicator is configured to be selectable by any user of the selected group-based communication channel;

receive an indication of an input indicating a selection of the thread summary indicator; and cause, based at least in part on receiving the indication of the input, rendering of the subsidiary channel-based thread communication to a thread communication pane within the group-based communication interface, wherein the thread communication pane is separate from the channel list pane and the channel messaging pane within the group-based communication interface, wherein the channel list pane, the channel messaging pane, and the thread communication pane are configured to be rendered within the defined display window as viewable simultaneously, and wherein content of the thread communication pane is particular to the first messaging communication.

16. The computer program product of claim 15, wherein the thread summary indicator indicates that the subsidiary channel-based thread communication is associated with the first messaging communication of the plurality of messaging communications, and further wherein the thread summary indicator comprises a thread count and a latency indicator.

17. The computer program product of claim 15, wherein the computer program instructions, when executed by a processor, further cause the computer program product to:
cause a thread actuator to be rendered within the channel messaging pane proximate the first messaging communication, wherein the thread request comprises user selection of the thread actuator; and
receive, after receiving the user selection of the thread actuator, a thread communication message, wherein the thread communication message is rendered within the thread communication pane.

18. The computer program product of claim 17, wherein the computer program instructions, when executed by a processor, further cause the computer program product to:
in response to receiving the thread communication message, update the thread summary indicator within the channel messaging pane to indicate that the thread communication message was received.

19. The computer program product of claim 15, wherein the computer program instructions, when executed by a processor, further cause the computer program product to:
cause a first message input register to be rendered within the thread communication pane, the first message input register configured to receive a new thread communication message associated with the subsidiary channel-based thread communication, the first message input register being different than a second message input register rendered within the channel messaging pane.

20. The computer program product of claim 19, wherein the first message input register within the thread communication pane and the second message input register within the channel messaging pane are configured to be rendered within the defined display window as viewable simultaneously.

21. A computer-implemented method for generating a group-based communication interface within a defined display window of a user client device, the group-based communication interface defining a channel list pane comprising a plurality of group-based communication channels and a channel messaging pane, the computer-implemented method comprising:
receiving a first messaging communication associated with a selected group-based communication channel of the plurality of group-based communication channels, the selected group-based communication channel comprising a plurality of messaging communications;
causing the first messaging communication to be rendered within the channel messaging pane;
receiving, from the user client device, a thread request to create a subsidiary channel-based thread communication, wherein the thread request is associated with the first messaging communication in the selected group-based communication channel;
in response to receiving the thread request, generating and transmitting for display a thread summary indicator renderable within the channel messaging pane proximate the first messaging communication, wherein the thread summary indicator is configured to be selectable by any user of the selected group-based communication channel;
receiving an indication of an input indicating a selection of the thread summary indicator; and
causing, based at least in part on receiving the indication of the input, rendering of the subsidiary channel-based thread communication to a thread communication pane within the group-based communication interface, wherein the thread communication pane is separate from the channel list pane and the channel messaging pane within the group-based communication interface, wherein the channel list pane, the channel messaging pane, and the thread communication pane are configured to be rendered within the defined display window as viewable simultaneously, and wherein content of the thread communication pane is particular to the first messaging communication.

22. The computer-implemented method of claim 21, further comprising:
causing a thread actuator to be rendered within the channel messaging pane proximate the first messaging communication, wherein the thread request comprises user selection of the thread actuator; and
receiving, after receiving the user selection of the thread actuator, a thread communication message, wherein the thread communication message is rendered within the thread communication pane.

23. The computer-implemented method of claim 22, further comprising:
in response to receiving the thread communication message, updating the thread summary indicator within the channel messaging pane to indicate that the thread communication message was received.

24. The computer-implemented method of claim 21, further comprising:
receiving a thread communication message, wherein the thread communication message is rendered within the thread communication pane and wherein the thread communication message is associated with a profile identifier, wherein the profile identifier is configured to associate the thread communication message with a user of the selected group-based communication channel; and
in response to receiving the thread communication message and the profile identifier, updating a thread indication within the channel list pane, the thread indication indicating that the profile identifier was received in the thread communication message.

25. The computer-implemented method of claim 21, further comprising:
receiving a thread summary view request; and
in response to receiving the thread summary view request, cause at least a portion of the subsidiary channel-based thread communication and at least a portion of one or more thread communication messages to be rendered within a thread summary communication pane.

26. The computer-implemented method of claim 25, further comprising:
in response to receiving the thread summary view request, cause a notification to be rendered within the thread summary communication pane, wherein the notification indicates receipt of new thread communication messages that have not yet been rendered for viewing by a thread-associated user profile.

27. The computer-implemented method of claim 21, wherein the indication of the input indicating the selection of the thread summary indicator is a selected thread view request, the computer-implemented method further comprising:
- in response to receiving the selected thread view request, cause the first messaging communication and one or more thread communication messages particular to the first messaging communication to be rendered within the thread communication pane.

28. The computer-implemented method of claim 21, further comprising:
- receiving a follow request that is configured to activate notifications corresponding to the subsidiary channel-based thread communication; and
- in response to receiving the follow request, updating a thread indication within the channel list pane, the thread indication indicating that the follow request was received.

29. The computer-implemented method of claim 21, further comprising:
- receiving a thread communication message in the thread communication pane, wherein the thread communication message is rendered within the thread communication pane;
- receiving a share request associated with the thread communication message in the thread communication pane; and
- in response to receiving the share request, cause the thread communication message to be rendered within the channel messaging pane.

30. The computer-implemented method of claim 29, further comprising:
- receiving a selected thread view request associated with the thread communication message rendered in the channel messaging pane; and
- in response to receiving the selected thread view request associated with the thread communication message rendered in the channel messaging pane, cause the thread communication message to be rendered within the thread communication pane.

31. The computer-implemented method of claim 21, wherein the thread summary indicator indicates that the subsidiary channel-based thread communication is associated with the first messaging communication of the plurality of messaging communications, and further wherein the thread summary indicator comprises a thread count and a latency indicator.

* * * * *